US011933427B2

United States Patent
Geng et al.

(10) Patent No.: US 11,933,427 B2
(45) Date of Patent: Mar. 19, 2024

(54) FLUID MANAGEMENT ASSEMBLY AND THERMAL MANAGEMENT SYSTEM

(71) Applicant: ZHEJIANG SANHUA INTELLIGENT CONTROLS CO., LTD, Zhejiang (CN)

(72) Inventors: Senrun Geng, Zhejiang (CN); Alfred Gunther, Zhejiang (CN); Xu Yong, Zhejiang (CN); Zhu Zhenshan, Zhejiang (CN); Rongrong Zhang, Zhejiang (CN)

(73) Assignee: ZHEJIANG SANHUA INTELLIGENT CONTROLS CO., LTD., Zhejiang (CN)

( * ) Notice: Subject to any disclaimer, the term of this patent is extended or adjusted under 35 U.S.C. 154(b) by 113 days.

(21) Appl. No.: 17/622,472

(22) PCT Filed: Jun. 19, 2020

(86) PCT No.: PCT/CN2020/097019
§ 371 (c)(1),
(2) Date: Dec. 23, 2021

(87) PCT Pub. No.: WO2020/259398
PCT Pub. Date: Dec. 30, 2020

(65) Prior Publication Data
US 2022/0268364 A1 Aug. 25, 2022

(30) Foreign Application Priority Data

Jun. 24, 2019 (CN) .......................... 201910549205.8

(51) Int. Cl.
*F16K 5/06* (2006.01)
*F16K 5/12* (2006.01)
(Continued)

(52) U.S. Cl.
CPC .............. *F16K 5/0605* (2013.01); *F16K 5/12* (2013.01); *F16K 5/20* (2013.01); *F16K 11/0873* (2013.01);
(Continued)

(58) Field of Classification Search
CPC .. F16K 5/0605; F16K 11/0873; F16K 11/087; F16K 11/08; F16K 27/067
See application file for complete search history.

(56) References Cited

U.S. PATENT DOCUMENTS 7,789,106 B2 * 9/2010 Reck ................... F16K 11/0873
137/878
10,533,485 B2 * 1/2020 Carter ...................... F01P 11/20
(Continued)

FOREIGN PATENT DOCUMENTS

| CN | 201547328 U | 8/2010 | |
| CN | 106032853 A * | 10/2016 | .............. F16K 11/04 |

(Continued)

OTHER PUBLICATIONS

Chinese Office Action dated Dec. 28, 2021 for Chinese Appl. No. 2019-10800054.9.
(Continued)

*Primary Examiner* — Michael R Reid
(74) *Attorney, Agent, or Firm* — Ohlandt, Greeley and Perle, LLP

(57) ABSTRACT

A fluid management assembly and a thermal management system. The fluid management assembly has a first chamber and a first valve core located in the first chamber. The fluid management assembly has a throttle chamber. The first valve core has a conduction channel. The first chamber can communicate with other portions by means of a throttle channel or the conduction channel.

15 Claims, 27 Drawing Sheets

(51) Int. Cl.
*F16K 5/20* (2006.01)
*F16K 11/087* (2006.01)
*F16K 15/06* (2006.01)
*F16K 27/06* (2006.01)
*F16K 31/40* (2006.01)
*F16K 31/53* (2006.01)

(52) U.S. Cl.
CPC .......... *F16K 15/065* (2021.08); *F16K 27/067* (2013.01); *F16K 31/408* (2013.01); *F16K 31/535* (2013.01)

(56) References Cited

U.S. PATENT DOCUMENTS

| | | |
|---|---|---|
| 2010/0024906 A1 | 2/2010 | Moeller et al. |
| 2014/0238067 A1 | 8/2014 | Itou et al. |
| 2014/0290772 A1 | 10/2014 | Itou et al. |
| 2018/0209548 A1 | 7/2018 | Zens et al. |
| 2018/0283579 A1 | 10/2018 | Morein |

FOREIGN PATENT DOCUMENTS

| | | |
|---|---|---|
| CN | 106032853 A | 10/2016 |
| CN | 106151554 A | 11/2016 |
| CN | 206830859 U | 1/2018 |
| CN | 207830635 U | 9/2018 |
| CN | 108730553 A | 11/2018 |
| CN | 108869787 A | 11/2018 |
| CN | 109027343 A | 12/2018 |
| CN | 208907756 U | 5/2019 |
| CN | 109838585 A | 6/2019 |
| CN | 109838587 A | 6/2019 |
| DE | 2427905 A1 | 1/1979 |
| EP | 2574767 A2 | 4/2013 |
| JP | H1181423 A | 3/1993 |
| JP | 2004270707 A | 9/2004 |
| JP | 2013092354 A | 5/2013 |
| JP | 2013092355 A | 5/2013 |
| JP | 2013103522 A | 5/2013 |
| JP | 2015137779 A | 7/2015 |
| JP | 5991277 B2 | 9/2016 |
| JP | 2017106686 A | 6/2017 |
| RU | 67214 U1 | 10/2007 |

OTHER PUBLICATIONS

Japanese Office Action dated Feb. 7, 2023 for Japanese Appl. No. 2021-576775.
Japanese Search Report dated Feb. 15, 2023 for Japanese Appl. No. 2021-576775.
International Search Report dated Sep. 30, 2020 for PCT Appl. No. PCT/CN2020/097019.
Extended European Search Report dated Dec. 4, 2023 for European Appl. No. 20831055.7.

* cited by examiner

FLUID MANAGEMENT ASSEMBLY AND THERMAL MANAGEMENT SYSTEM

This application is a national phase application of PCT international patent application no. PCT/CN2020/097019, which claims the priority of Chinese Patent Application No. 201910549205. 8, titled "FLUID MANAGEMENT ASSEMBLY", filed on Jun. 24, 2019 with the China National Intellectual Property Administration, which are incorporated herein by reference in their entireties.

BACKGROUND

1. Field of the Disclosure

The present application relates to the technical field of fluid management.

2. Discussion of the Background Art

A thermal management system includes some functional components. These functional components are arranged in different positions, or in other words, these functional components are distributed in different positions of the thermal management system. The functional components need to be conducting to be the thermal management system through pipelines, and the pipelines between the functional components are paths in which fluid flow. It is a technical problem to propose a fluid management assembly, which is beneficial to optimize the thermal management system.

SUMMARY

An object according to the present application is direct to a fluid management assembly and a thermal management system, which facilitates to solving the above problems.

In one aspect, a fluid management assembly is provided according to an embodiment of the present application, which includes a first valve core and a valve body. The first valve core has a conduction passage, the fluid management assembly includes a throttle chamber, the fluid management assembly includes a first passage, a first chamber and a second chamber, the first chamber is configured to be in communication with the second chamber through the first passage, the first passage is provided with a first opening of the first passage in a wall of the second chamber, the first valve core is located in the first chamber and is able to act in the first chamber. The second chamber is formed in the valve body. The fluid management assembly includes a first flow passage, a second flow passage, a third flow passage and a fourth flow passage, the first flow passage is in communication with the first chamber, and the second flow passage is formed in the valve body. The second flow passage is in communication with the second chamber. The third flow passage forms a first opening of the third flow passage in the wall of the second chamber.

The first valve core includes a first operation position and a second operation position, in the first operation position of the first valve core, the conduction passage communicates the first chamber with the fourth flow passage. In the second operation position of the first valve core, the throttle chamber communicates the first chamber with the second chamber.

In another aspect, a thermal management system is provided according to an embodiment of the present application, which includes a compressor, a first heat exchanger, a second heat exchanger and the fluid management assembly, the compressor includes an outlet and an inlet, the fluid management assembly includes a first valve core and a valve body, the first valve core includes a conduction passage, and the fluid management assembly includes a throttle chamber.

The fluid management assembly includes a first chamber and a second chamber, the first valve core is located in the first chamber and is able to act in the first chamber, the second chamber is formed in the valve body, the fluid management assembly has a first flow passage, a second flow passage, a third flow passage and a fourth flow passage, the first flow passage is in communication with the first chamber, the second flow passage is in communication with the second chamber, a first opening of the third flow passage is formed in a wall of the second chamber, the first chamber is configured to be in communication with the fourth flow passage through the conduction passage or with the throttle chamber, and the first chamber is configured to be in communication with the second chamber through the conduction passage or the throttle chamber.

The outlet of the compressor is in communication with a refrigerant inlet of the first heat exchanger, a refrigerant outlet of the first heat exchanger is in communication with a first communication port of the fluid management assembly, the first communication port is a port formed by the first flow passage in the valve body, a second communication port of the fluid management assembly is in communication with the inlet of the compressor, the second communication port is a port formed by the second flow passage on the valve body, one of the third flow passage and the fourth flow passage is configured to be in communication with the inlet of the compressor through the second heat exchanger.

The fluid management assembly includes the first valve core and the valve body, the first valve core is located in the first chamber of the fluid management assembly, the first valve core has the conduction passage, the fluid management assembly includes the throttle chamber, the conduction passage can communicate the first chamber with the fourth flow passage of the fluid management assembly, and the throttle chamber can communicate the first chamber with the second chamber of the fluid management assembly. Such a fluid management assembly can relatively reduce pipeline connection between functional components, which is beneficial to optimizing the thermal management system.

DETAILED DESCRIPTION OF THE PREFERRED EMBODIMENTS

Figure 1:
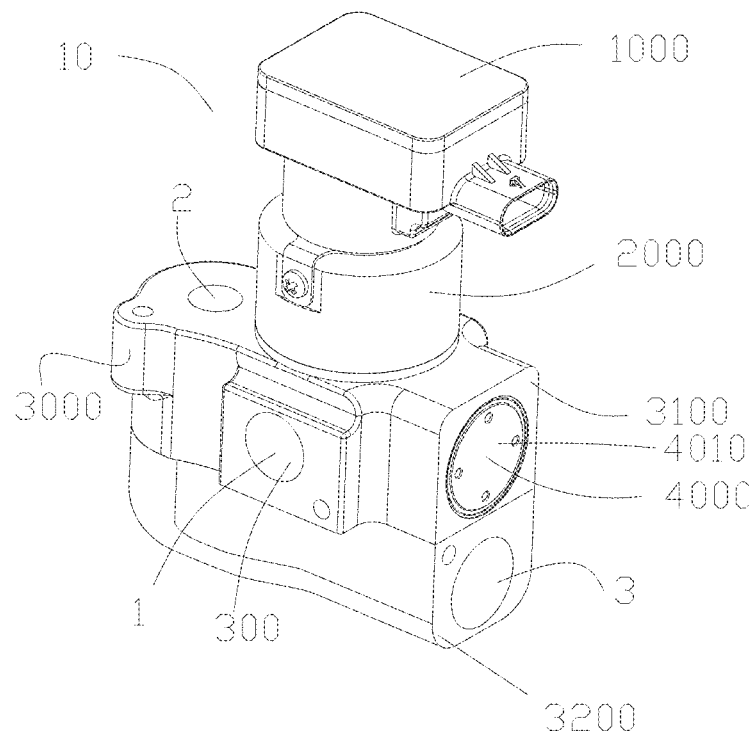
FIG. 1 is a schematic three-dimensional structural view of a first embodiment of a fluid management assembly.
Figure 2:
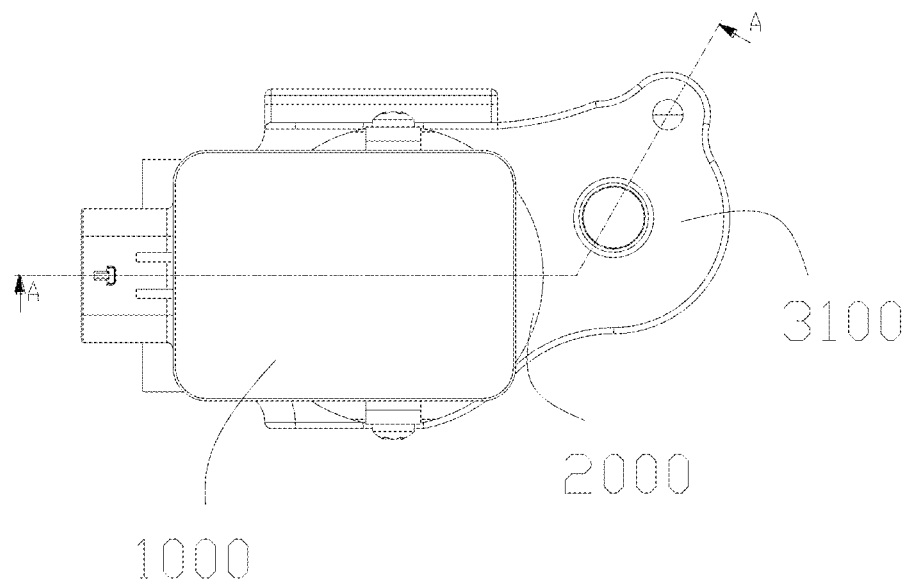
FIG. 2 is a schematic structural top view in FIG. 1.

A fluid management assembly and a thermal management system according to the technical solution of the present application may be in many manners, some of which can be applied to a vehicle thermal management system, and some can be applied to other thermal management system including a household thermal management system or a commercial thermal management system, etc. A fluid management assembly for vehicles and a thermal management system for vehicles are particularly described with reference to the drawings hereinafter.

Referring to FIGS. 1 to 16 and 38 to 44, a fluid management assembly 10 includes a control unit, a transmission device 2000, a valve body 3000 and a first valve core 5000. In the technical solution of the present application, the control unit is a driving mechanism 1000, and the transmission device 2000 is located between the driving mechanism 1000 and the valve body 3000. The driving mechanism 1000 includes a motor unit 1100, a sleeve 1200 and a connecting seat 1300, and one end of the connecting seat 1300 is fixedly connected to the sleeve 1200 and a connection between the connecting seat 1300 and the sleeve 1200 is sealed. The motor unit 1100 includes a stator 1110, a motor shaft 1130 and a rotor 1120, the stator 1110 is sleeved outside the sleeve 1200, the rotor 1120 is fixedly connected to the motor shaft 1130, at least part of the rotor 1120 is located inside the sleeve 1200, and the motor shaft 1130 passes through a through hole of the connecting seat 1300. After energization, the rotor 1120 is rotated under the action of the excitation magnetic field generated by the stator 1110 so as to drive the motor shaft 1130 to rotate. The transmission device 2000 includes a gear box 2100, a planetary assembly 2200 and a valve stem 2300. One end of the gear box 2100 is provided a step fixedly connected to the connecting seat 1300, the step is formed with a step hole, and the connecting seat 1300 is threadly connected to or sealingly welded to the step. In addition, a sealing member may be provided at a connection for improving the sealing performance when the connecting seat 1300 is threadly connected to the step. The other end of the gear box 2100 is fixedly connected to the valve body 3000, and the gear box 2100 may be sealingly welded to the valve body 3000, or the gear box 2100 may be threadly connected to the valve body 3000 with a sealing member being provided at a connection. The planetary assembly 2200 is located in a chamber formed by the gear box 2100, or the planetary assembly 2200 is located in a chamber formed by the gear box 2100, the connecting seat 1300 and/or the valve body 3000. The planetary assembly 2200 includes a sun gear 2210, multiple planet gears 2220, a gear shaft, a first gear ring 2230, a second gear ring 2240 and two mounting plates 2250. In this embodiment, the planetary assembly 2200 includes three planet gears 2220, which are meshing connected with the sun gear 2210. Both the first gear ring 2230 and a second gear ring 2240 are provided with internal teeth. A part of each of the planet gears 2220 is meshing connected with the internal teeth of the first gear ring 2230, and the other part of each of the planet gears 2220 is meshing connected with the internal teeth of the second gear ring 2240. An outer side portion of the first gear ring 2230 is fixedly connected to the gear box 2100, for example, the first gear ring 2230 is relatively fixed to the gear box 2100 by interference fit or stop fit. The planet gears 2220 and the sun gear 2210 are located between the two mounting plates 2250, and a through hole through which the motor shaft 1130 passes is provided on the mounting plate 2250 close to the driving mechanism 1000, so as to facilitate the cooperation of the motor shaft 1130 and the sun gear 2210.

Figure 3:
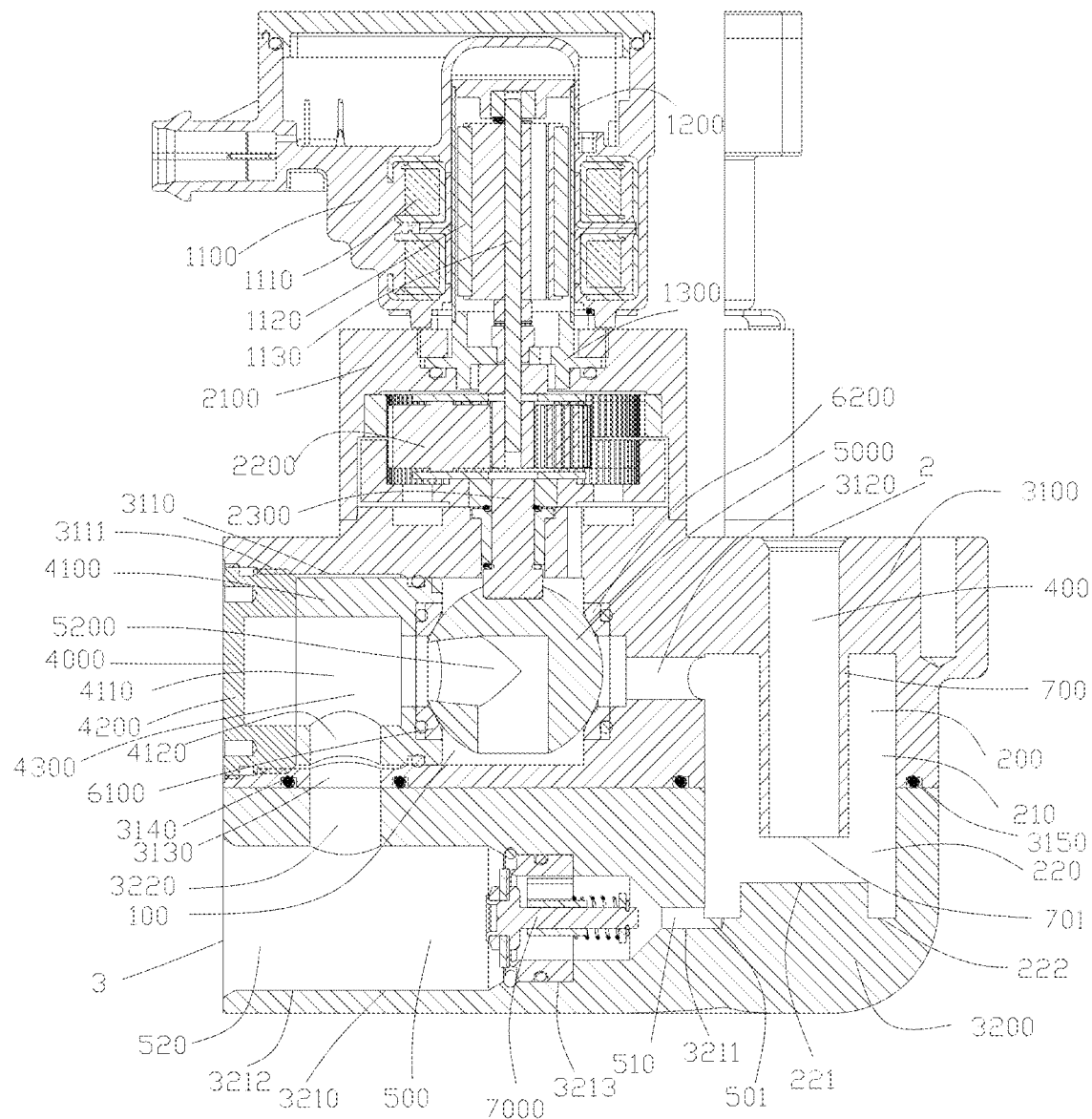
FIG. 3 is a schematic cross sectional view of a first embodiment taken along line A-A in FIG. 2.
Figure 4:
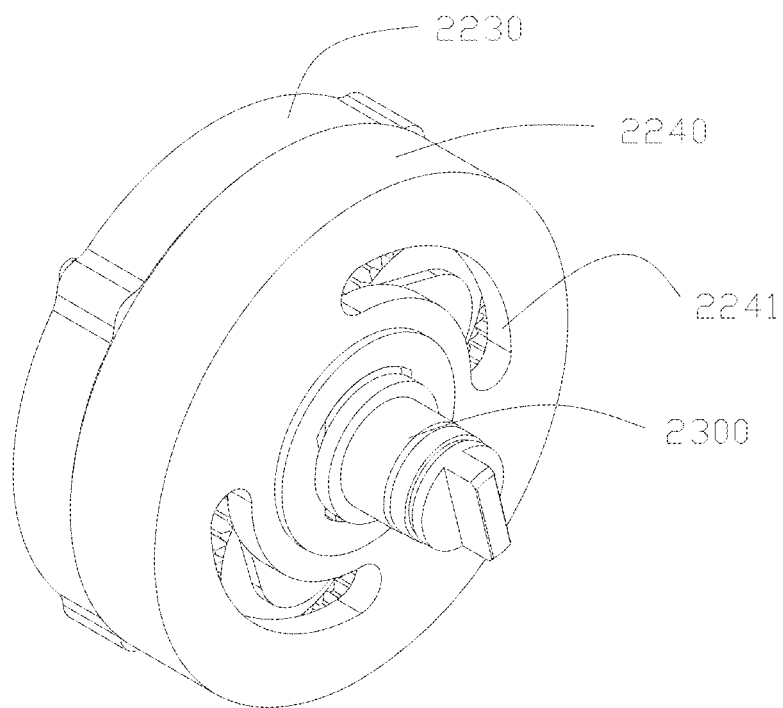
FIG. 4 is a schematic three-dimensional structural view of a planetary assembly viewed from a first visual angle.
Figure 5:
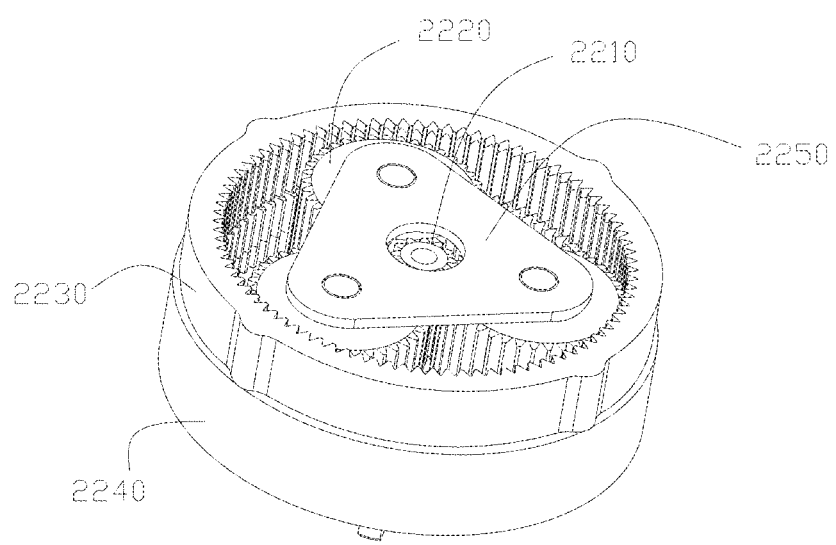
FIG. 5 is a schematic three-dimensional structural view of the planetary assembly viewed from a second visual angle.

Referring to FIGS. 3 to 5, the second gear ring 2240 has a stop portion 2241, which is arranged on a side of the second gear ring 2240 facing the valve body 3000. In this embodiment, the stop portion 2241 is formed as two arc-shaped grooves, which are arranged symmetrically relative to an axis of the second gear ring 2240. Accordingly, referring to FIG. 13, the valve body 3000 is provided with stop posts 3010 for cooperating with the stop portion 2241. Similarly, the stop posts 3010, which are arranged symmetrically relative to the axis of the second gear ring 2240, are located in the arc-shaped grooves, and the rotation range of the second gear ring 2240 can be set by two ends of the stop portion 2241. It can be known that the rotation range of the second gear ring 2240 is defined by setting an arc angle between the two ends of the stop portion 2241, so as to set the rotation range of the valve stem 2300. In this embodiment, the arc angle of the stop portion 2241 is set to 90 degrees, and the arc angle of the stop portion 2241 may be set adaptively according to different application environments. One end of the valve stem 2300 extends through a center hole of the second gear ring 2240, and the valve stem 2300 is fixedly connected to the second gear ring 2240 by inference fit or welding. Alternatively, the valve stem 2300 may be conducting to the second gear ring 2240 by injection molding.

In the case that the fluid management assembly 10 is in operation, in a case that the motor shaft 1130 rotates, the sun gear 2210 rotates driven by the motor shaft 1130. Due to the meshing effect, the planet gears 2220 rotate driven by the sun gear 2210, the first gear ring 2230 is fixed. The planet gears 2220 not only rotate around its own axis, but also rotate circumferentially around the sun gear 2210, so as to drive the second gear ring 2240 to rotate while the valve stem 2300 also rotates with the rotation of the second gear ring 2240. Since the stop portion 2241 and the stop posts 3010 are in mutual cooperating, the valve stem 2300 rotates within a certain range. The valve body 3000 includes a valve stem hole, in which part of the valve stem 2300 is located, and the valve stem 2300 is dynamically sealed to the valve stem hole. In addition, the fluid management assembly 10 may further include a bush, the bush is embedded in the valve stem hole and fixed to the valve stem hole, the valve stem 2300 is sleeved in the bush and dynamically sealed to the bush. Referring to FIG. 3, the fluid management assembly 10 includes a first chamber 100 and a second chamber 200, the first chamber 100 can be in communication with the second chamber 200, the first valve core 5000 of the fluid management assembly 10 is arranged in the first chamber 100, and the first valve core 5000 is rotatable in the first chamber 100.

Referring to FIGS. 3 to 39, the fluid management assembly 10 includes a first flow passage 300, a second flow passage 400 and a third flow passage 500. The first flow passage 300 is provided with a first communication port 1 on an outer wall of the valve body 3000, the second flow passage 400 is provided with a second communication port 2 in the outer wall of the valve body 3000, and the third flow passage 500 is provided with a third communication port 3 in the outer wall of the valve body 3000. The first flow passage 300 is in communication with the first chamber 100, the third flow passage 500 can be in communication with the second chamber 200, and the second flow passage 400 is in communication with the second chamber 200. In one or more embodiments of the technical solution of the present application, the first flow passage 300 is an inlet passage of the first chamber 100, the second flow passage 400 is an outlet passage of the second chamber 200, and the third flow passage 500 is another outlet passage of the second chamber 200. The fluid management assembly 10 further includes a conduction pipe 700, and the second flow passage 400 includes a chamber formed by the conduction pipe 700. In this embodiment, the conduction pipe 700 is integrated with the valve body 3000, a first port 701 of the conduction pipe 700 faces a bottom wall of the second chamber 200 and is in communication with the second chamber 200. In the technical solution of this embodiment, an axial direction of the conduction pipe 700 is oriented in an upward and downward direction, the first port 701 of the conduction pipe 700 faces downward. Accordingly, a wall of the second chamber 200 which the first port 701 of the conduction pipe 700 faces is the bottom wall of the second chamber 200.

Figure 43:
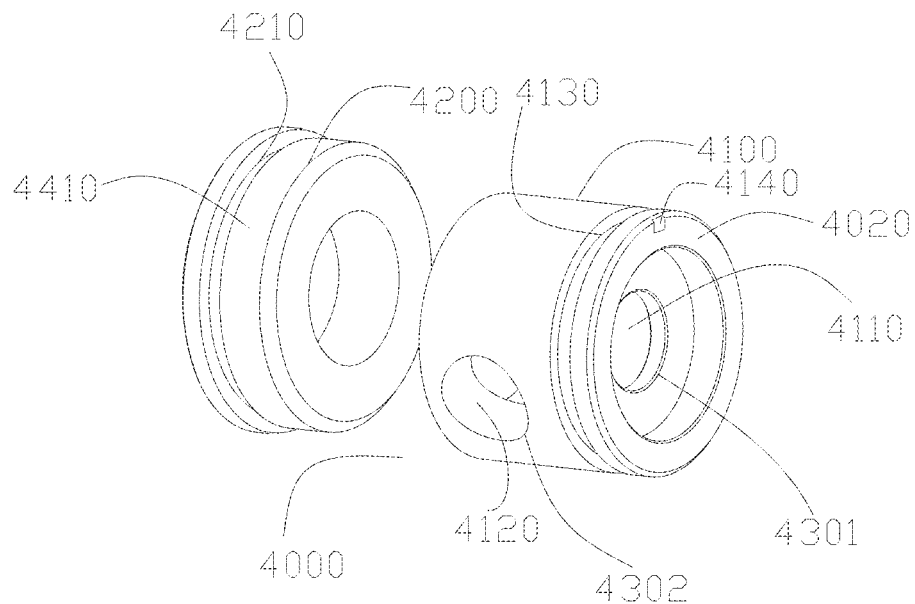
FIG. 43 is a schematic three-dimensional structural view of a first embodiment of a valve bonnet in FIG. 3.
Figure 44:
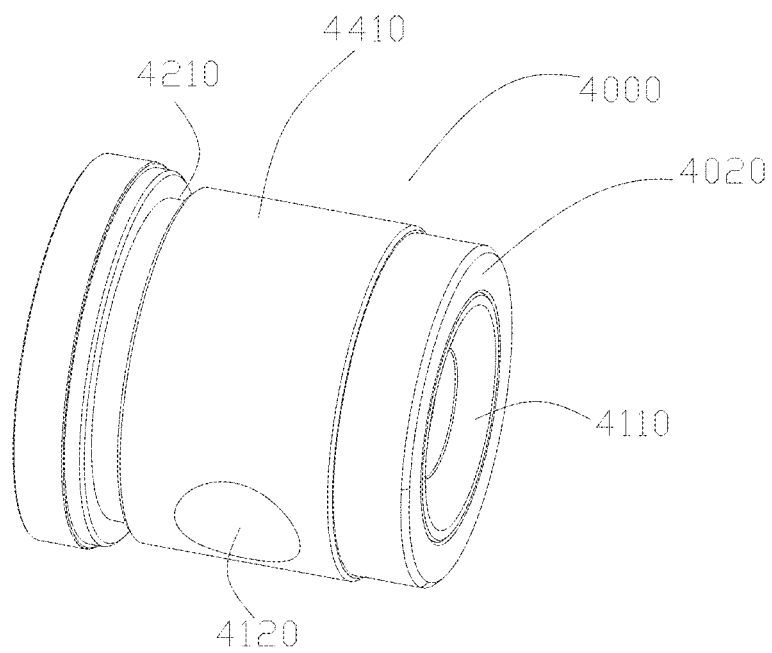
FIG. 44 is a schematic three-dimensional structural view of a second embodiment of the valve bonnet.
Figure 45:
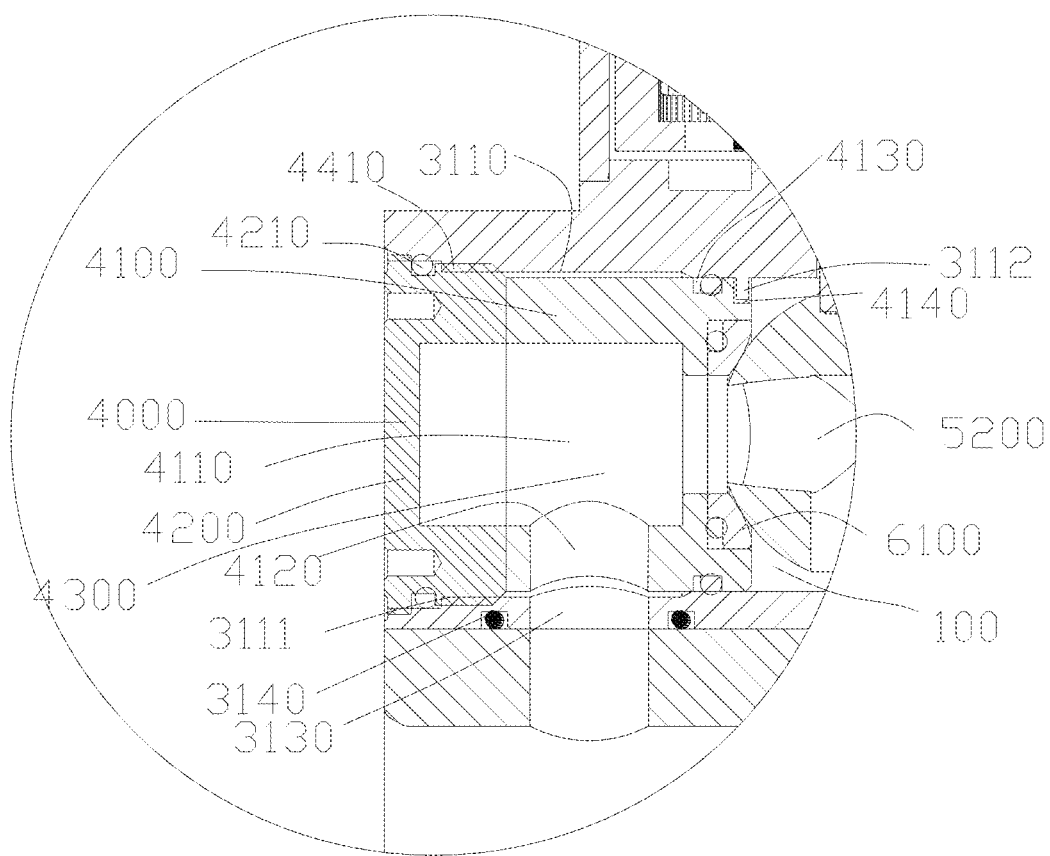
FIG. 45 is a schematic partial enlarged view of FIG. 3.
Figure 46:
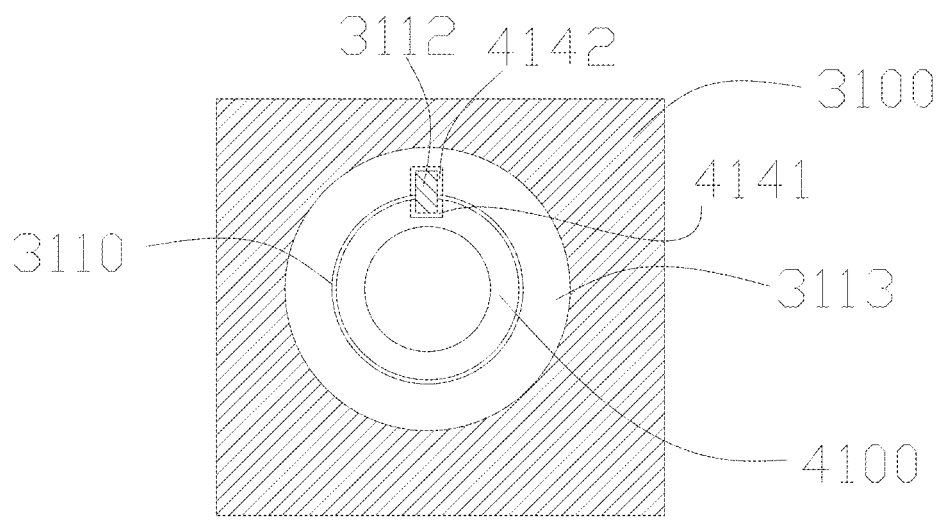
FIG. 46 is a schematic view showing the connection of the valve bonnet and a first opening portion.
Figure 47:
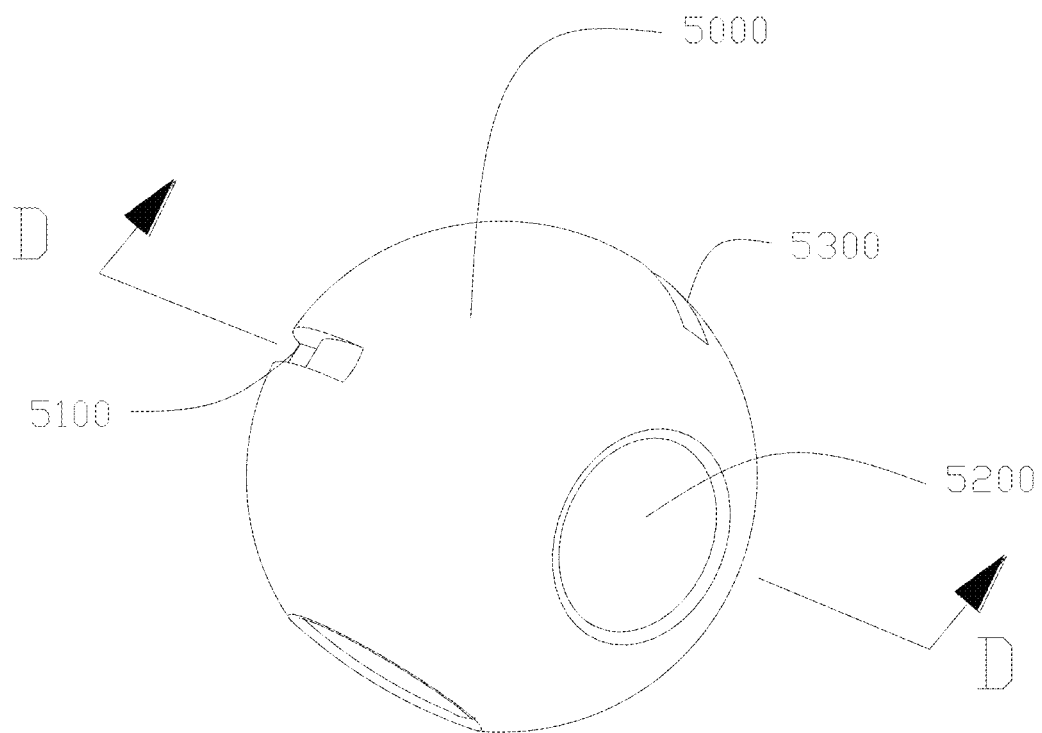
FIG. 47 is a schematic structural view of a second embodiment of the first valve core viewed from the first visual angle.

Referring to FIGS. 1, 3 and 43, the fluid management assembly 10 further includes a valve bonnet 4000, the valve body 3000 includes a first opening portion 3110, and the first opening portion 3110 is recessed from a side wall of the valve body 3000 toward an interior of the valve body 3000. The first opening portion 3110 has an opening in the side wall of the valve body 3000, at least part of the valve bonnet 4000 is located in a chamber formed by the first opening portion 3110, and the valve bonnet 4000 is fixed with the first opening portion 3110. Specifically, the fluid management assembly 10 includes a connecting device, the connecting device includes a connecting portion 4410 and a matching portion 3111, the connecting portion 4410 is formed on the valve bonnet 4000, and the matching portion 3111 is formed on a wall of the first opening portion 3110. In a specific embodiment, the matching portion 3111 is formed with an internal thread on the first opening portion 3110, the connecting portion 4410 is formed with an external thread on an outer wall of the valve bonnet 4000, and the internal thread of the first opening portion 3110 cooperates with the external thread of the valve bonnet 4000 so as to fix the valve bonnet 4000 with the first opening portion 3110. In other embodiments, the fluid management assembly 10 further includes a snap ring, the connecting portion is formed with a groove in the outer wall of the valve bonnet, and the matching portion is formed with a groove on the wall of the first opening portion. As the snap ring arranged in the groove of the connecting portion reaches a predetermined position, the snap ring opens, and part of the snap ring is located in the groove of the first opening portion, so as to fix the valve bonnet 4000 with the valve body 3000.

The fluid management assembly 10 further includes a first accommodating chamber, a second accommodating chamber and a sealing member. The sealing member is located in the first accommodating chamber and the second accommodating chamber. The first accommodating chamber is closer to the first valve core than the second accommodating chamber, and the first accommodating chamber and the second accommodating chamber circumferential surround the valve bonnet. In a specific embodiment, the first accommodating chamber is formed as a first groove 4130 and the second accommodating chamber is formed as a second groove 4210, or the first accommodating chamber includes a chamber formed by the first groove 4130 and the second accommodating chamber includes a chamber formed by the second groove 4210, and the first groove 4130 and the second groove 4210 are circumferentially distributed along an outer side wall of the valve bonnet 4000. The second groove 4210 is located between an outer end wall 4010 of the valve bonnet 4000 and the external thread of the valve bonnet 4000, the first groove 4130 is located between an inner end wall 4020 of the valve bonnet 4000 and the external thread of the valve bonnet 4000, and the sealing members are located in the first groove 4130 and the second groove 4210 of the valve bonnet 4000. The two grooves of the valve bonnet 4000, the sealing members and the first opening portion 3110 cooperate with each other so as to realize the sealing between the valve bonnet 4000 and the first opening portion 3110. In other embodiments, the grooves for placing the sealing members may be arranged in the first opening portion 3110, so as to realize the sealing between the valve bonnet 4000 and the first opening portion 3110. In addition, the valve bonnet 4000 may be sealingly fixed to the first opening portion 3110 by welding, which will not be described in detail.

Referring to FIGS. 3 and 43, the valve bonnet 4000 includes a first conduction passage 4300, the first conduction passage 4300 is provided with a first opening 4301 of the first conduction passage 4300 on the inner end wall 4020 of the valve bonnet 4000, and the first conduction passage 4300 is provided with a second opening 4302 of the first conduction passage 4300 on a side wall of the valve bonnet 4000. Specifically, the valve bonnet 4000 includes a first hole 4110 and a second hole 4120, and a chamber formed by the first hole 4110 is in communication with a chamber formed by the second hole 4120. In this embodiment, the first conduction passage 4300 includes a chamber formed by the first hole 4110 and a chamber formed by the second hole 4120, and the axis of the first hole 4110 is parallel to the axis of the first opening portion 3110, and the "parallel" herein means that an included angle between the axis of the first hole 4110 and the axis of the first opening portion 3110 is within ±10 degrees. The axis of the second hole 4120 is perpendicular to the axis of the first opening portion 3110, and the "perpendicular" herein means that an included angle between the axis of the second hole 4120 and the axis of the first opening portion 3110 ranges from 80 degrees to 90 degrees. In addition, an included angle between the axis of the second hole 4120 and the axis of the first hole 4110 may range from 45 degrees to 135 degrees. An opening of the first hole 4110, that is, the first opening 4301 of the first communication passage 4300, is formed on the inner end wall of the valve bonnet 4000. An opening of the second hole 4120, that is, the second opening 4302 of the first communication passage 4300, is formed in the side wall of the valve bonnet 4000. The opening of the second hole 4120 is located between the first groove 4130 and the second groove 4210 in an axial direction of the first opening portion 3110, which can prevent fluid being leaked. It can be known that a wall forming the first chamber 100 includes a portion of wall of the first opening portion 3110 and the inner end wall of the valve bonnet 4000. In other embodiments, the wall forming the first chamber 100 may not include the inner end wall of the valve bonnet 4000. In this embodiment, the valve bonnet 4000 includes a first sub valve bonnet 4100 and a second sub valve bonnet 4200. The first sub valve bonnet 4100 is separately arranged with the second sub valve bonnet 4200, and the first sub valve bonnet 4100 is closer to the first valve core 5000 than the second sub valve bonnet 4200. The first sub valve bonnet 4100 includes the first hole 4110 and the second hole 4120, the opening of the first hole 4110 is just the first opening 4301 of the first conduction passage 4300, and the first opening 4301 is located on an inner end wall of the first sub valve bonnet 4100. The opening of the second hole 4120 is just the second opening 4302 of the first conduction passage 4300, and the second opening 4302 is located on a side wall of the first sub valve bonnet 4100. The second sub valve bonnet 4200 has an external thread, which cooperates and is fixed to the internal thread of the first opening portion 3110, and an outer end wall of the first sub valve bonnet 4100 abuts against an inner side wall of the second sub valve bonnet 4200. The first groove 4130 is located in the side wall of the first sub valve bonnet 4100, and the second groove 4210 is located on a side wall of the second sub valve bonnet 4200.

Referring to FIGS. 43 to 46, the fluid management assembly 10 includes a stop device. The stop device includes a stop recess 4140 and a stop pin 3112, the stop recess 4140 has an opening in the side wall of the first sub valve bonnet 4100, at least portion of the stop pin is located in the stop recess 4140, and the stop pin 3112 is integrated or separately arranged with the valve body 3000. In a specific embodiment, the stop recess 4140 is provided with openings in the side wall of the first sub valve bonnet 4100 and the inner end wall of the first sub valve bonnet 4100, and the opening of the stop recess 4140 in the side wall of the first sub valve bonnet 4100 is in communication with the opening of the stop recess 4140 on the inner end wall of the first sub valve bonnet 4100. The stop pin 3112 is integrated with the valve body 3000, and the stop pin 3112 protrudes from a side wall of the first opening portion 3110 toward the first sub valve bonnet 4100. When the valve bonnet 4000 is mounted, the stop recess 4140 cooperates with the stop pin 3112, and the first sub valve bonnet 4100 is arranged at a predetermined position, and then the second sub valve bonnet 4200 is tightened, which can prevent the first sub valve bonnet 4100 from being deviated from the predetermined position, and facilitate the positioning of the second opening 4302 of the first conduction passage 4300. Alternatively, the second sub valve bonnet 4200 may be integrated with the first sub valve bonnet 4100, which relatively reduces the mounting steps. In other embodiments, the stop recess 4140 includes a first stop recess 4141 and a second stop recess 4142, the first stop recess 4141 is provided with an opening at least on the outer end wall of the first sub valve bonnet 4100, and the opening of the first stop recess 4141 on the outer end wall of the first sub valve bonnet 4100 is integrated with an opening of the first stop recess 4141 in the side wall of the first sub valve bonnet 4100. The first opening portion 3110 includes a step wall 3313, the second stop recess 4142 has openings on the step wall 3313 and the side wall of the first opening portion 3110, and the opening of the second stop recess 4142 on the step wall 3313 is integrated with the opening of the second stop recess 4142 on the first opening portion 3110. The stop pin 3112 is separately arranged with the valve body 3000, and the stop pin 3112 is located in the first stop recess 4141 and the second stop recess 4142.

Figure 6:
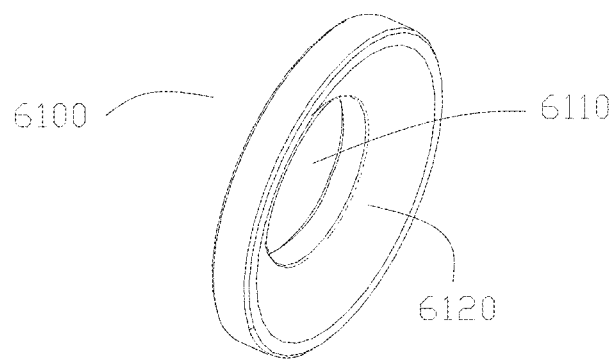
FIG. 6 is a schematic three-dimensional structural view of a first valve seat.

Referring to FIGS. 3 and 6 to 8, the fluid management assembly 10 includes a valve seat. Specifically, the valve seat includes a first valve seat 6100 and a second valve seat 6200. The first valve core 5000 has a spherical or quasi-spherical structure, or the first valve core 5000 may have a cylindrical structure. The first valve core 5000 includes a matching groove 5300 matching with the valve stem 2300, the valve stem 2300 can extend into the matching groove 5300, and the valve stem 2300 can drive the first valve core 5000 to rotate. The first valve core 5000 is arranged between the first valve seat 6100 and the second valve seat 6200 in the axial direction of the first opening portion 3110, both the first valve seat 6100 and the second valve seat 6200 have matching surfaces matching with the first valve core 5000. In a case that the first valve core 5000 is spherical or quasi-spherical, the matching surfaces are correspondingly arc-shaped surfaces, the matching surfaces of the valve seat may be convex toward the first valve core 5000, or may be recessed relative to the first valve core 5000. An outer wall of the first valve core 5000 abuts against at least part of the matching surface 6120 of the first valve seat, and the outer wall of the first valve core 5000 abuts against at least part of the matching surface of the second valve seat 6200, the first valve core 5000 is slidable relative to the matching surface 6120 of the first valve seat, and the first valve core 5000 is dynamically sealed to the matching surface 6120 of the first valve seat. The first valve core 5000 is slidable relative to the matching surface of the second valve seat 6200, and the first valve core 5000 is dynamically sealed to the matching surface of the second valve seat 6200. It can be known that, the wall forming the first chamber 100 includes the inner end wall of the valve bonnet 4000, a bottom wall of the first opening portion 3110 and part of the side wall of the first opening portion 3110, or the wall forming the first chamber 100 includes the inner end wall of the valve bonnet 4000, the bottom wall of the first opening portion 3110, part of the side wall of the first opening portion 3110, the matching surface 6120 of the first valve seat and the matching surface of the second valve seat 6200. Referring to FIGS. 3 and 6, the first valve seat 6100 has a passage 6110 through the first valve seat, the passage 6110 of the first valve seat is provided with a first opening of the passage of the first valve seat on the matching surface 6120 of the first valve seat. It can be known that the matching surface 6120 of the first valve seat is an annular arc-shaped surface, the passage 6110 of the first valve seat has openings both on the matching surface and on a side facing the first conduction passage 4300, so that the passage 6110 of the first valve seat is in communication with the first conduction passage 4300. Similarly, the second valve seat 6200 has a passage through the second valve seat 6200, the passage of the second valve seat 6200 has openings both on the matching surface of the second valve seat 6200 and on another side of the second valve seat 6200, and the passage of the second valve seat 6200 is provided with a first opening of the passage of the second valve seat 6200 on the matching surface of the second valve seat 6200. It can be known that the matching surface of the second valve seat 6200 is an annular arc-shaped surface, and the passage of the second valve seat 6200 can be in communication with the second chamber 200.

The first valve seat 6100 may also be integrated with the valve bonnet 4000, and the second valve seat 6200 is integrated with the first opening portion. The term "being integrated with" herein includes "being fixed as a whole" and "being integrally formed". Specifically, the first valve seat 6100 and the inner end wall of the valve bonnet 4000 are sealingly fixed as a whole or assembled and extruded as a whole. More specifically, the inner end wall of the valve bonnet 4000 is formed as a step for placing the first valve seat 6100, or in other words, at least part of the first valve seat 6100 is located at the step of the valve bonnet 4000, and accordingly, the opening of the first hole 4110 is formed at the step of the valve bonnet 4000. The fluid management assembly 10 may further be provided with a sealing member between the first valve seat 6100 and the step of inner end wall of the valve bonnet 4000 so as to enhance the sealing between the first valve seat 6100 and the valve bonnet 4000. Similarly, the second valve seat 6200 is integrated with the first opening portion 3110, which includes being fixed as a whole and being integrally formed. The second valve seat 6200 is fixedly arranged with the first opening portion 3110. Specifically, the second valve seat 6200 is sealingly fixed to the bottom wall of the first opening portion 3110. Specifically, a recess for accommodating the second valve seat 6200 is formed at the bottom wall of the first opening portion 3110, and a sealing member is provided between the second valve seat 6200 and the first opening portion 3110, so as to enhance sealing, reduce leakage, thereby improving the control accuracy. It should be noted that the valve seat and the sealing member may be made into an integral structure. In other embodiments, the first valve seat 6100 may be integrally formed with the valve bonnet 4000, or in other words, the valve bonnet 4000 has the first valve seat 6100. Similarly, the second valve seat 6200 may be integrally formed with the valve body, and the second valve seat 6200 is formed in the bottom wall of the first opening portion 3110. The fluid management assembly 10 is provided with the first valve seat 6100 and the second valve seat 6200, so that the first valve core 5000 can be supported by the first valve seat 6100 and the second valve seat 6200, and contact portions of the first valve seat 6100 and the second valve seat 6200 with the first valve core 5000 can be slidably sealed.

Figure 7:
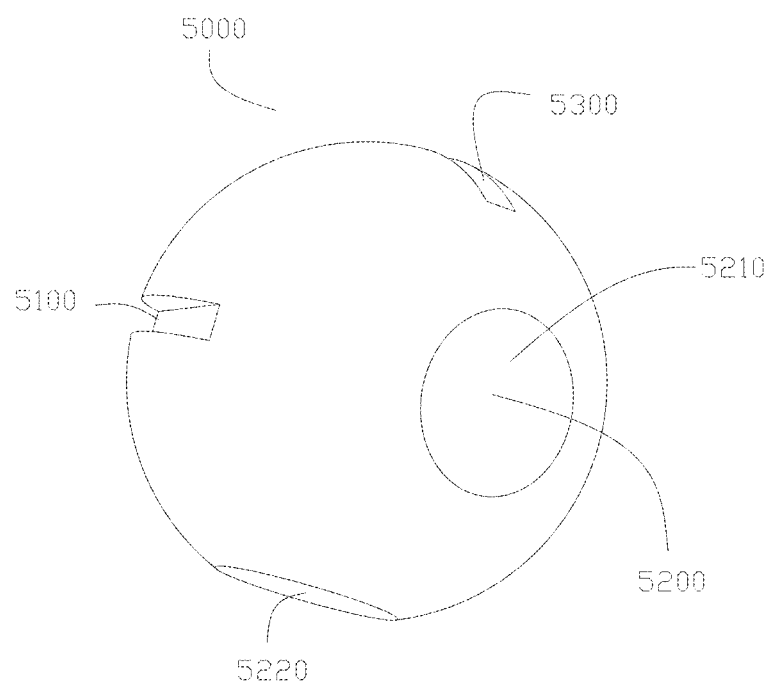
FIG. 7 is a schematic three-dimensional structural view of a first embodiment of the first valve seat.
Figure 8:
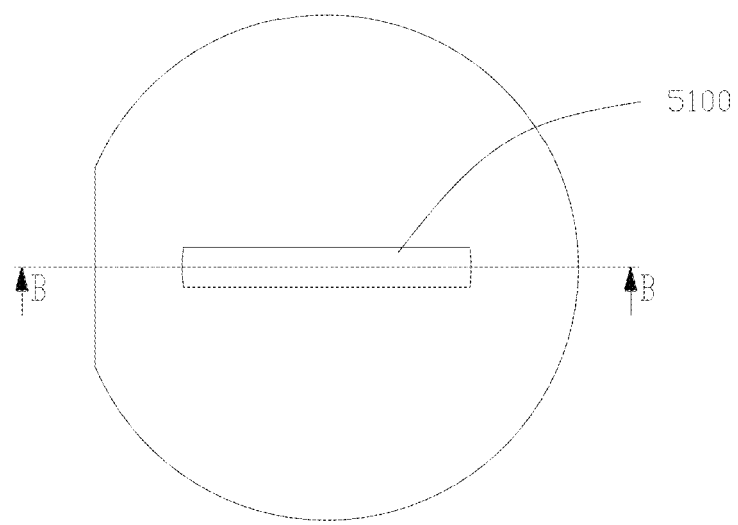
FIG. 8 is a schematic structural top view of a first valve core.
Figure 9:
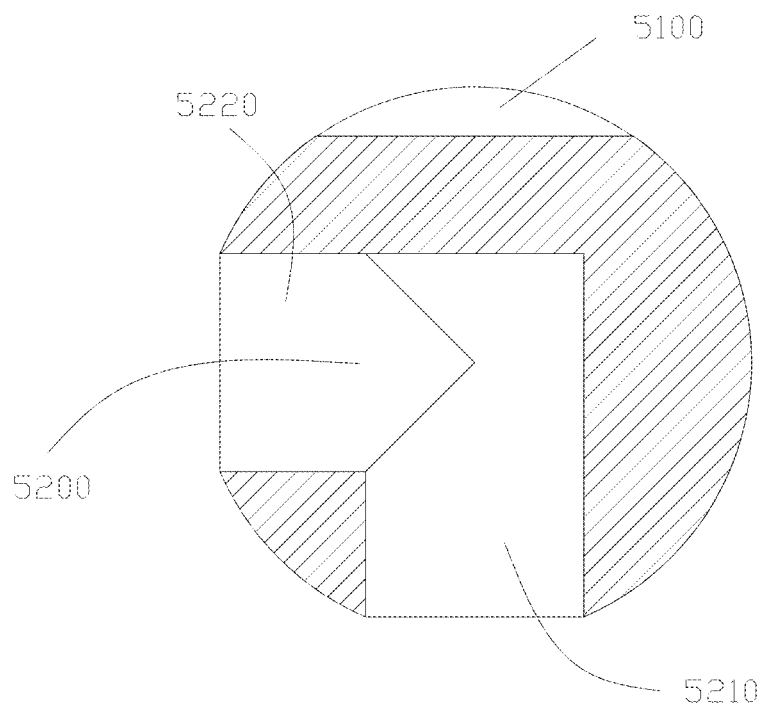
FIG. 9 is schematic cross sectional view taken along line B-B in FIG. 7.
Figure 10:
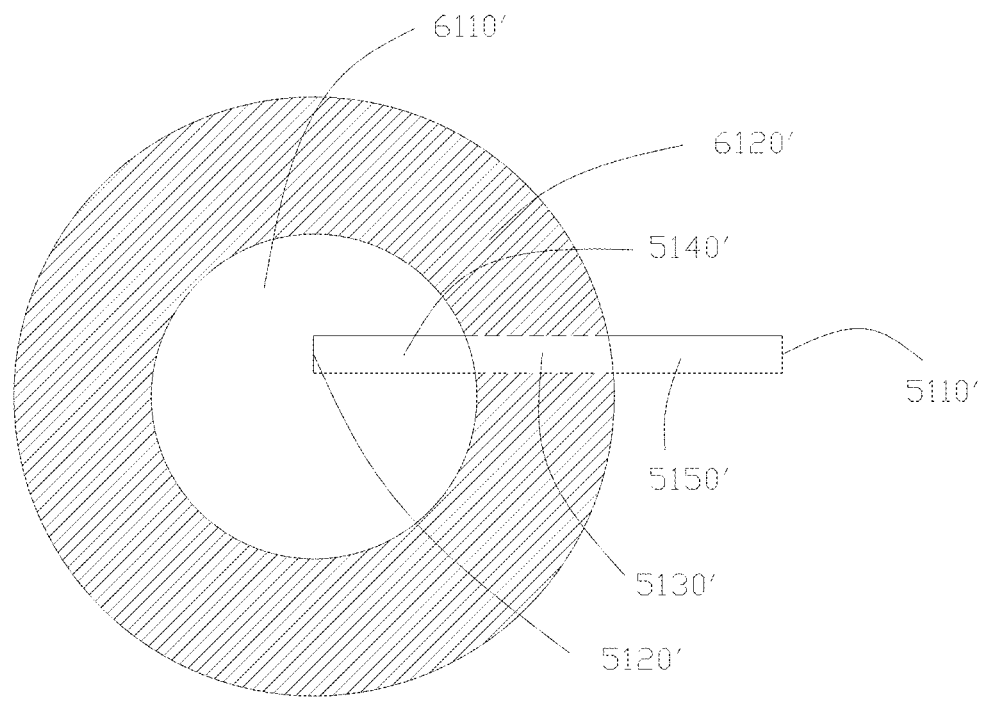
FIG. 10 is a schematic projection view of a first embodiment of a throttle passage and a matching surface of a valve seat on a first surface.
Figure 11:
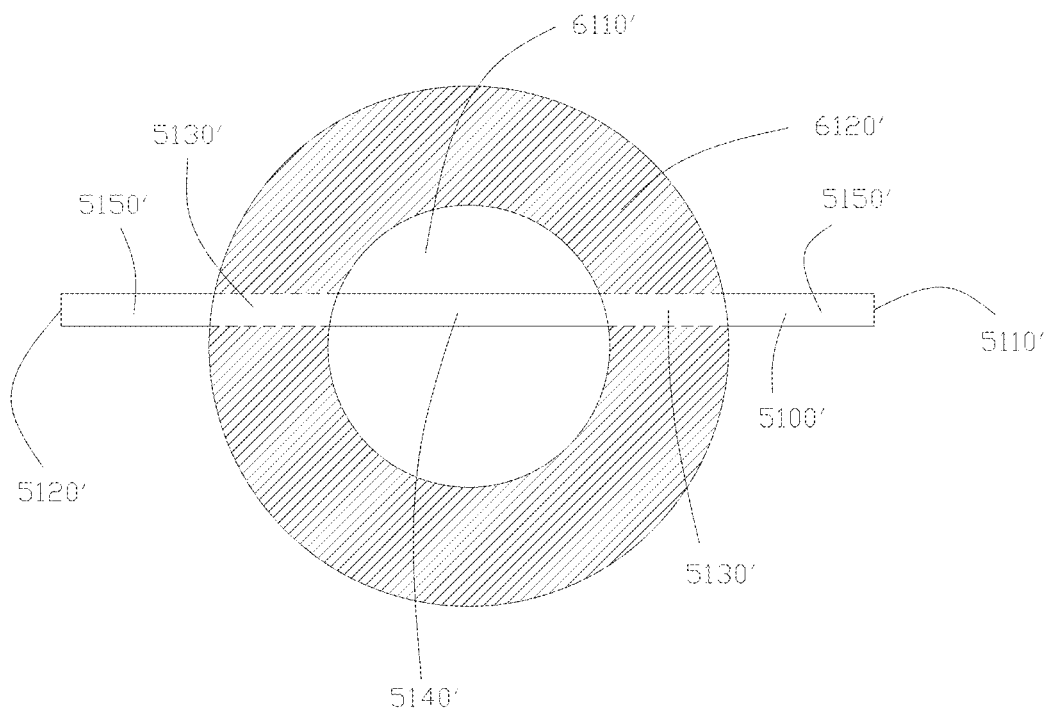
FIG. 11 is a schematic projection view of a second embodiment of the throttle passage and the matching surface of the valve seat on the first surface.

The fluid management assembly 10 includes a throttle chamber. Referring to FIGS. 7 to 11, the first valve core 5000 includes a throttle passage 5100 and a conduction passage 5200, and the throttle passage 5100 is not in communication with the conduction passage 5200. In this embodiment, the throttle passage 5100 is formed as a throttling groove, the throttle passage 5100 is recessed from the outer wall of the first valve core 5000, and the throttle passage 5100 has an opening in the outer wall of the first valve core 5000. Taking the first valve seat as an example, In the case that the fluid management assembly is throttling, part of the opening of the throttle passage 5100 faces the matching surface 6120 of the first valve seat, and a wall forming the throttle chamber includes the matching surface of the first valve seat 6100 and the corresponding wall of throttling groove. The throttle passage 5100 includes a head end and a tail end, referring to FIG. 9 and FIG. 10, a first surface is defined, which is perpendicular to the axis of the first opening portion 3110. It can be known that a projection 6120' of the matching surface 6120 of the first valve seat to the first surface is an annular surface. In the case that the fluid management assembly is throttling, a projection 5110' of the head end to the first surface and a projection 5120' of the tail end to the first surface are located on two sides of the projection 6120' of the matching surface to the first surface along the radial direction of the projection 6120' of the matching surface 6120 of the first valve seat. The terms "head end" and "tail end" described here refer to two ends of a bottom wall of the throttling groove or the portions extending from the two ends of the bottom wall into the throttling groove, so that the head end and the tail end of the throttling groove form an outlet and an inlet of the throttle chamber. In this embodiment, a cross section of the throttle passage 5100 has a shape of rectangular, as shown in FIG. 7. The cross section of the throttle passage 5100 may have a V-shape or other shapes. The extension direction of the throttle passage 5100 is substantially the same as the rotating direction of the first valve core 5000, or may form a certain angle with the rotating direction of the first valve core 5000. The throttle passage 5100 includes a first section, a second section and a third section, herein the second section includes the tail end, and the third section includes the head end. When the fluid management assembly is throttling, the opening of the first section faces the matching surface 6120 of the first valve seat, the opening of the second section faces the passage 6110 of the first valve seat, and the opening of the third section faces the first chamber 100, so that the fluid in the first chamber 100 enters the passage of the valve seat after passing through the throttle chamber. For better understanding, referring to FIG. 10, a projection 5130' of the first section to the first surface is located within the projection 6120' of the matching surface of the first valve seat, a projection 5140' of the second section to the first surface is located within a projection 6110' of the passage of the first valve seat, and a projection 5150' of the third section to the first surface is located within a projection of the first chamber, so that the openings of the throttle chamber are relatively increased, which is beneficial for the fluid entering the throttle chamber. Herein, the projection 5110' of the head end is located within the projection of the first chamber 100, and the projection 5120 of the tail end is located within the projection 6110' of the passage of the first valve seat. In another embodiment, referring to FIG. 11, the projection 5150' of the third section to the first surface includes two parts, which are both located outside the projection 6120' of the matching surface, that is, the opening of the third portion faces the first chamber. The projection 5130' of the first section also includes two parts, which are both located within the projection 6120' of the matching surface. The projection 5140' of the second portion is located within the projection 6110' of the passage of the first valve seat, so that the fluid in the first chamber 100 can enter the passage of the first valve seat through two throttling paths, which can increase the throttle passage and improve the efficiency. The wall forming the throttle chamber may form a throttling orifice. Specifically, the throttle passage may also be a throttling orifice, and the throttle passage 5100 has two openings in the outer wall of the first valve core 5000. The two openings of the throttling hole are just the head end and the tail end of the throttle passage. In the case that the fluid management assembly is throttling, the two openings of the throttle passage 5100 are located on two sides of the annular surface, one of the two openings of the throttle passage 5100 is in communication with the first chamber 100, the other one of the two openings of the throttle passage 5100 is in communication with the passage of the first valve seat 6100 or the passage of the second valve seat 6200, which will not be described in detail.

Figure 48:
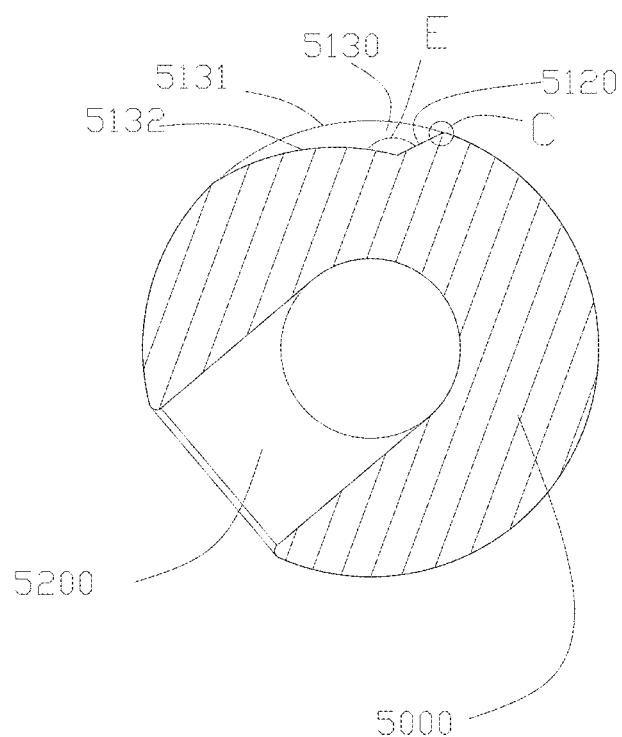
FIG. 48 is a schematic cross sectional view taken along line D-D in FIG. 47.
Figure 49:
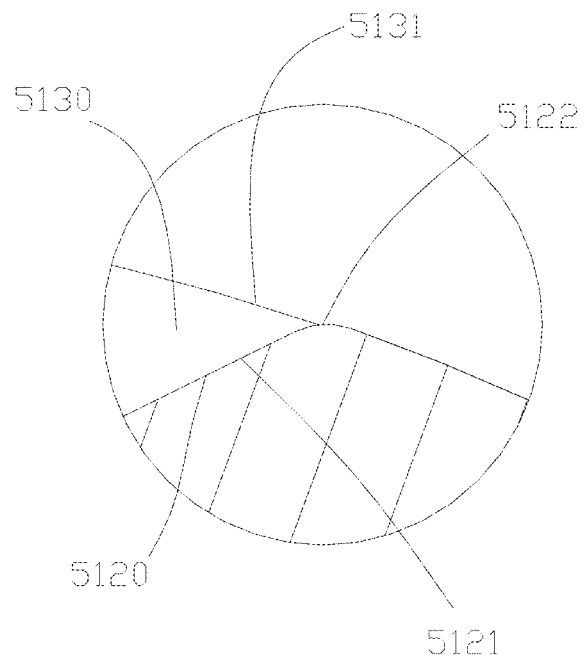
FIG. 49 is a schematic enlarged view of C portion in FIG. 48.

Referring to FIGS. 47 to 50, the throttle passage 5100 is formed as a throttling groove, a wall of the throttle passage includes a first bottom wall 5110 and a second bottom wall 5120, the first bottom wall 5110 is arranged intersected with the second bottom wall 5120. The term "arranged intersected" herein refers to that the first bottom wall 5110 and the second bottom wall 5120 have a common intersecting line or a common intersecting area, the common intersecting area may be a rounding or chamfering between the first bottom wall 5110 and the second bottom wall 5120. The first bottom wall 5110 extends from the outer wall of the first valve core to the second bottom wall 5120 and the second bottom wall 5120 extends from the first bottom wall 5110 to the outer wall of the first valve core 5000 in a direction of movement or rotation of the first valve core 5000. It can be known that a wall of the head end of the throttle passage 5100 may be a part of the first bottom wall 5110, a wall of the tail end of the throttle passage 5100 may be a part of the second bottom wall 5120. Alternatively, the wall of the head end of the throttle passage 5100 may be a part of the second bottom wall 5120, and the wall of the tail end of the throttle passage 5100 may be a part of the first bottom wall 5110. In this embodiment, the first bottom wall 5110 is an arc-shaped surface, and a convexity of the first bottom wall 5110 is the same as the opening of the throttle passage 5000. The first bottom wall 5110 may have other shapes, such as a flat surface, or combination of a flat surface and an arc-shaped surface, which will not be described in detail. Referring to FIG. 49, the second bottom wall 5120 includes a straight section 5121 and a first arc-shaped section 5122, the first arc-shaped section 5122 extends from the outer wall of the first valve core 5000 to the straight section 5120, and the straight section 5121 is closer to a center of the first valve core 5000 than the first arc-shaped section 5122 in the radial direction of the first valve core 5000. In other embodiments, the second bottom wall 5120 may only include the first arc-shaped section 5122, and the first arc-shaped section 5122 extends from the outer wall of the first valve core 5000 toward the first bottom wall 5110. The first arc-shaped section 5122 is provided on the second bottom wall, which reduces the sharpness of a connection between the second bottom wall 5120 and the outer wall of the first valve core 5000, and can relatively reduce the wear of the first valve core 5000 to the matching surface of the valve seat. Similarly, a second arc-shaped section is provided on the first bottom wall 5110, and the second arc-shaped section extends from the outer wall of the first valve core toward the second bottom wall 5120, which will not be described in detail.

Figure 50:
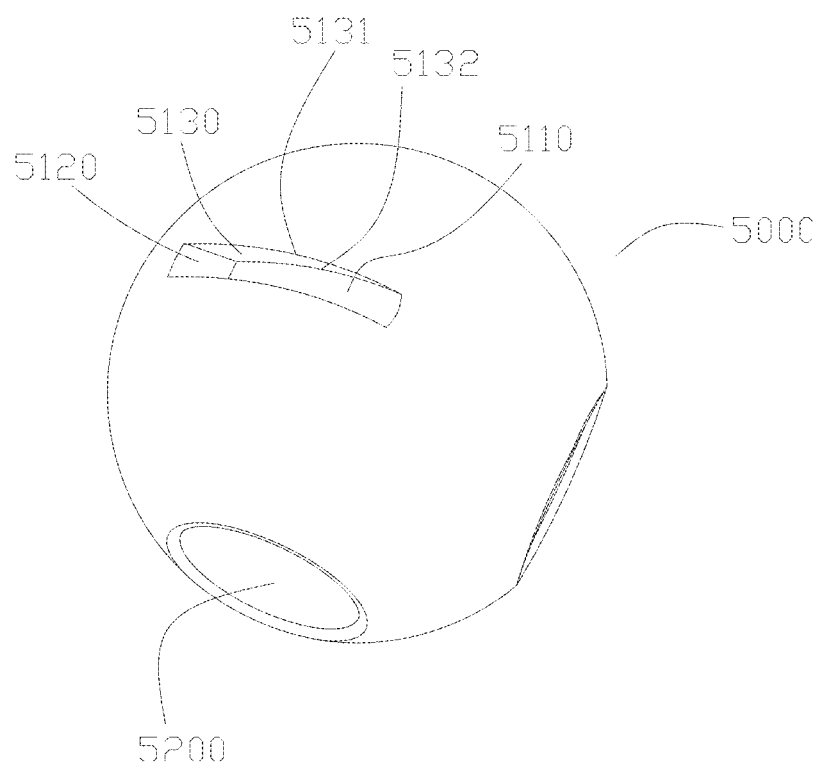
FIG. 50 is a schematic structural view of the second embodiment of the first valve core viewed from the second visual angle.

In this embodiment, along the rotating direction of the first valve core 5000, the length of the opening of the throttle passage 5100 is longer than that of the first bottom wall 5110, and the length of the opening of the throttle passage 5100 is longer than a length of the second bottom wall 5120. The opening of the throttle passage 5100 is longer than both the first bottom wall 5110 and the second bottom wall 5120, which facilitates for processing tools to act in the throttle passage, such as for the processing tool to enter or exit the throttle passage, for the processing tool to move in the throttle passage, and reduces the difficulty in processing the first valve core 5000. Referring to FIG. 50, the wall of the throttle passage 5100 further includes a first side wall 5130 and a second side wall, the first side wall 5130 is arranged opposite to the second side wall, the first bottom wall 5110 is located between the first side wall 5130 and the second side wall, the second bottom wall 5120 is located between the first side wall 5130 and the second side wall, an included angle between a surface where the first bottom wall 5110 is located and a surface where the first side wall 5130 is located may be 90 degrees, or greater than or less than 90 degrees. Similarly, an included angle between the surface where the first bottom wall 5110 is located and a surface where the second side wall is located may be 90 degrees, or greater than or less than 90 degrees. The first side wall 5130 includes a first side line 5131 and a second side line 5132, herein the first side line is located in the outer wall of the first valve core 5000, or in other words, the first side line 5131 is an intersecting line or an intersecting area between the outer wall of the first valve core 5000 and the first side wall 5130. The second side line 5132 is located on the first bottom wall 5110, or in other words, the second side line 5132 is an intersecting line or an intersecting area between the first bottom wall 5110 and the first side wall 5130. In this embodiment, an arc center of the first side line 5131 is arranged offset to an arc center of the second side line 5132, which facilitates the processing and forming to the throttle passage 5100. Along the direction of movement of the first valve core 5000, a radial distance between the first side line 5131 and the second side line 5132 decreases; or in other words, along the action direction of the first valve core 5000, a depth of the throttling groove decreases; or in other words, along the action direction of the first valve core 5000, a radial distance between the opening of the throttle passage 5100 and the first bottom wall 5110 decreases. In this way, along the action direction of the first valve core 5000, a cross-sectional area of the throttle passage 5100 decreases, that is, a fluid flow decreases. The cross-sectional area of the throttle passage 5100 can be adjusted by adjusting a rotation angle of the first valve core 5000, so as to adjust the fluid flow. Furthermore, along the action direction of the first valve core 5000, the first side line 5131 is parallel to the action direction of the first valve core 5132, so that it will be relative fast with relatively high efficiency when the fluid management assembly 10 adjusts the cross-sectional area of the throttle passage 5100 by rotating the first valve core 5000.

In this embodiment, referring to FIG. 48, an included angle between the first bottom wall 5110 and the second bottom wall 5120 is a first included angle E. Herein the first included angle E is greater than or equal to 80 degrees and less than or equal to 160 degrees. The included angle referred to here may be an included angle between the surface where the first bottom wall 5110 is located and a surface where the second bottom wall 5120 is located, or an included angle between a tangent plane of the first bottom wall 5110 and a tangent plane of the second bottom wall 5120, or an included angle between the tangent plane of the first bottom wall 5110 and the surface where the second bottom wall 5120 is located, or an included angle between the tangent plane of the second bottom wall 5120 and the surface where the first bottom wall 5110 is located. During the rotation of the first valve core 5000, a distance between the second bottom wall 5120 and the matching surface of the valve seat gradually decreases as the distance between the tail end of the throttle passage 5100 and the matching surface of the valve seat gradually decreases. During the throttling process of the fluid management assembly, in a case that the distance between the tail end of the throttle passage 5100 and the matching surface of the first valve seat 6100 is larger than a distance between the matching surface of the first valve seat 6100 and the first bottom wall 5110, the flow adjustment by the first valve core 5000 can be performed normally. In a case that the distance between the tail end and the matching surface 6120 of the first valve seat is less than the distance between the matching surface 6120 of the first valve seat and the first bottom wall 5110, a chamber formed by the tail end of the throttle passage 5100 and the matching surface 6120 of the first valve seat is formed as a fluid passage, and the throttling effect is relatively poor or does not meet the requirement. Therefore, the included angle between the first bottom wall 5110 and the second bottom wall 5120 is set so that the distance between the first bottom wall 5110 and the matching surface of the valve seat is relatively extended or the interference of the tail end is delayed, that is, the adjustment range of the throttle passage 5100 is extended, which is beneficial to improving the flow adjustment performance of the fluid management assembly.

Referring to FIGS. 7 to 9 and 39, the fluid management assembly 10 has a conduction function, and the conduction is achieved through the conduction passage 5200. The connection passage 5200 is formed in the first valve core 5000 and provided with two openings, which are formed in the outer wall of the first valve core 5000. In the case that the fluid management assembly is conducted, along a radial direction of the projection of the matching surface of the valve seat, two projections of the conduction passage 5200 are located on two sides of the matching surface. Specifically, the first valve core 5000 includes a third hole 5210 and a fourth hole 5220, a chamber formed by the third hole 5210 is in communication with a chamber formed by the fourth hole 5220, and the conduction passage 5200 of the first valve core 5000 includes the chamber formed by the third hole 5210 and the chamber formed by the fourth hole 5220. In this embodiment, an axis of the fourth hole 5220 is parallel to an axis of the valve stem 2300. An opening of the fourth hole 5220 in the outer wall of the first valve core 5000 faces away from the valve stem 2300, and an axis of the third hole 5210 is perpendicular to the axis of the valve stem 2300. In this embodiment, the first flow passage 300 has an opening on the wall of the first opening portion 3110, or in other words, the first flow passage 300 has an opening on the wall of the first chamber 100, the first flow passage 300 is in communication with the first chamber 100, and an axis of the first flow passage 300 is perpendicular to the axis of the first opening portion 3110. Correspondingly, the axis of the third hole 5210 is perpendicular to the axis of the fourth hole 5220. In the case that the fluid management assembly 10 is in operation, the fluid in the first flow passage 300 enters the first chamber 100, and then enters the fourth hole 5220, and then enters the third hole 5210. In a case that an opening of the first hole 4110 is in communication with the passage 6120 of the first valve seat, the conduction function of the fluid management assembly 10 is realized. The axis of the fourth hole 5220 may be perpendicular to the axis of the valve stem 2300, so that the opening of the fourth hole 5220 can be arranged opposite to the opening of the first flow passage 300, and an opening of the third hole 5210 can be arranged opposite to the passage 6120 of the first valve seat, which can reduce the flow resistance of the fluid in the first flow passage 300 passing into the conduction passage 5200. It can be known that an included angle between the axis of the third hole 5210 and the axis of the fourth hole 5220 may range from 45 degrees to 135 degrees. In the case that the fluid management assembly 10 is conducting, one opening of the conduction passage 5200 is arranged opposite to the passage of the valve seat, the other opening of the conduction passage 5200 faces the first chamber, so that the communication between the first chamber 100 and the passage of the valve seat can be realized.

Figure 39:
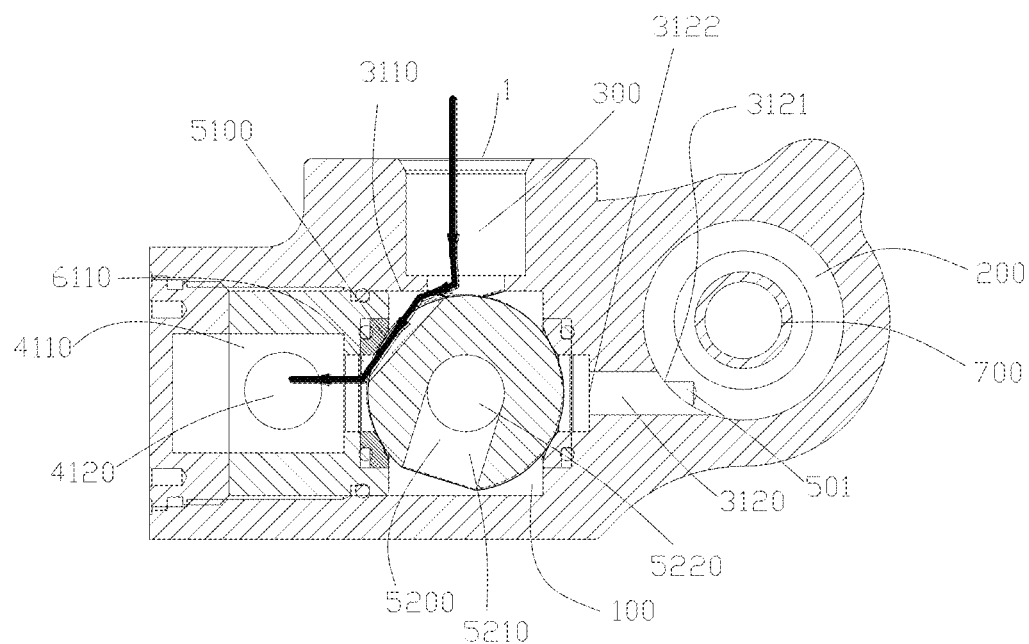
FIG. 39 is a schematic cross sectional view taken along line E-E in FIG. 38, in which the first valve core is located in a third operation position.

Referring to FIG. 3 and FIG. 39, the valve body 3000 further includes a first passage 3120, and the first chamber 100 can be in communication with the second chamber 200 through the first passage 3120. Specifically, the first passage 3120 has two openings, the first passage 3120 forms a first opening 3121 of the first passage 3120 on the wall of the second chamber 200, so that the first passage 3120 is in communication with the second chamber 200. The first passage 3120 is provided with a second opening 3122 of the first passage 3120 in the bottom wall of the first opening portion 3110, so that the second opening 3122 of the first passage 3120 is in communication with the passage of the second valve seat 6200. In this embodiment, an axis of the first passage 3120 is parallel to the axis of the first opening portion 3110. The term "parallel" here includes the situation of the axes being overlapped, and further includes the situation that the included angle between the axis of the first passage 3120 and the axis of the first opening portion 3110 is within ±10° degrees. In other embodiments, the first passage 3120 may just be the first opening of the first passage.

In order to improve the gas-liquid separation effect in the second chamber 200, the fluid management assembly 10 further includes the conduction pipe 700. The conduction pipe 700 may be processed and formed by the same profile with the valve body 3000, or the conduction pipe 700 may be separately arranged with the valve body 3000, and then assembled together. A first port 701 of the conduction pipe 700 is located in the second chamber 200, and the first port 701 of the conduction pipe 700 faces the bottom wall of the second chamber 200. In this embodiment, referring to FIG. 18, a side wall of the second chamber 200 includes a first sub-portion 230 and a second sub-portion 240, the second sub-portion 240 is located between a top wall of the second chamber 200 and the first port 701 of the conduction pipe 700, and the first opening 3121 of the first passage is located on the second sub-portion 240, which can prevent the fluid discharged from the first opening 3121 of the first passage from directly entering the second flow passage 400. Instead, after the gas-liquid separation process, the gas enters the second flow passage 400 through a chamber of the conduction pipe, and the liquid is deposited and collected in the bottom wall of the second chamber 200. In this embodiment, the first opening 3121 of the first passage is located in the side wall of the second chamber 200, and the farther the first opening 3121 of the first passage is from the first port 701 of the conduction pipe 700, the less likely the liquid is to be sucked away by the conduction pipe 700. Alternatively, the first passage 3120 may be provided with the first opening of the first passage 3120 on the top wall of the second chamber 200, or the first passage 3120 may be provided with the first opening of the first passage 3120 on the top wall and the second sub-portion of the second chamber 200.

Figure 12:
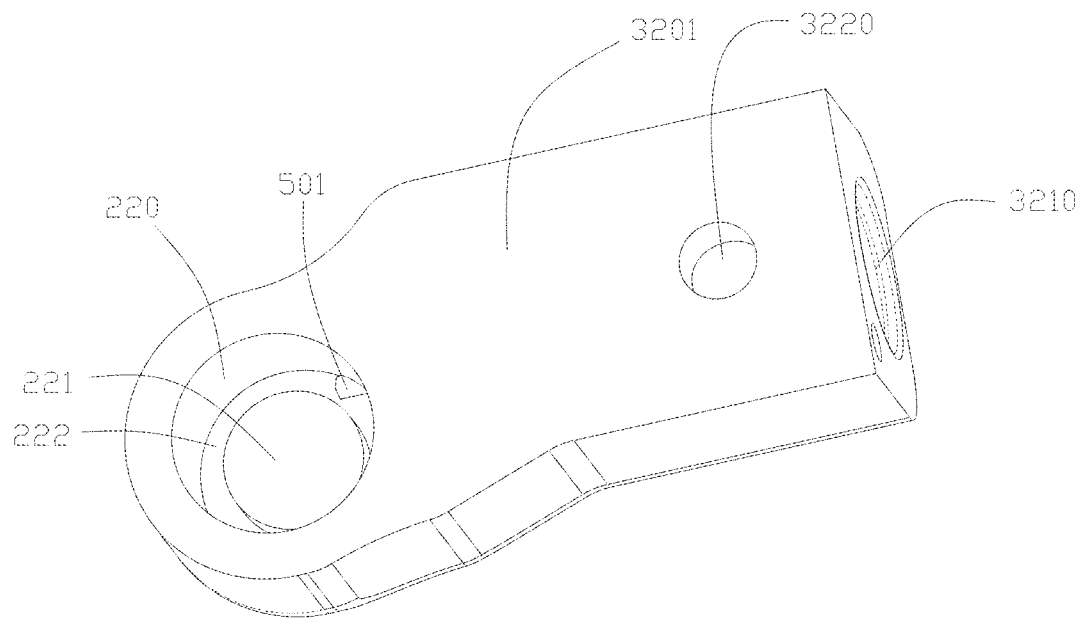
FIG. 12 is a schematic three-dimensional structural view of a second valve body in FIG. 1.
Figure 13A:
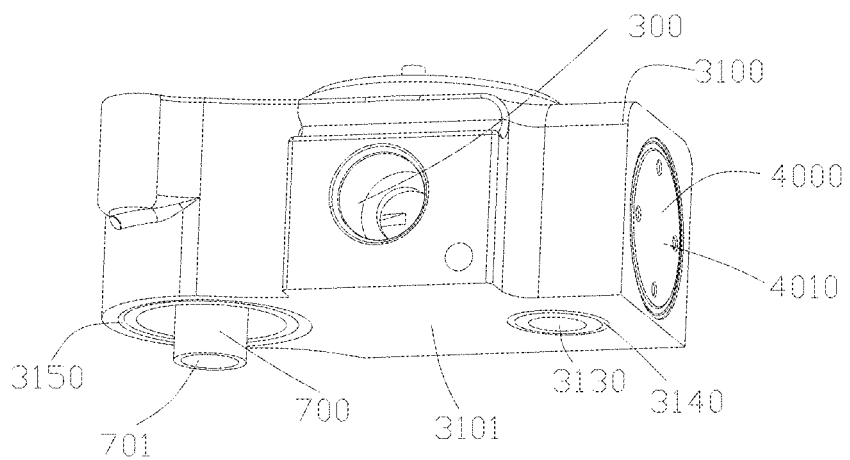
FIG. 13A is a schematic three-dimensional structural view of a first valve body in FIG. 1 viewed from the first visual angle.
Figure 13B:
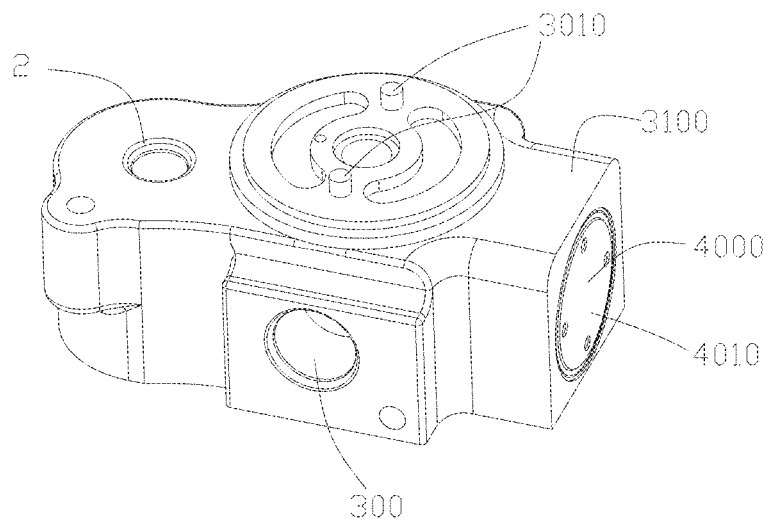
FIG. 13B is a schematic three-dimensional structural view of the first valve body in FIG. 1 viewed from the second visual angle.
Figure 14:
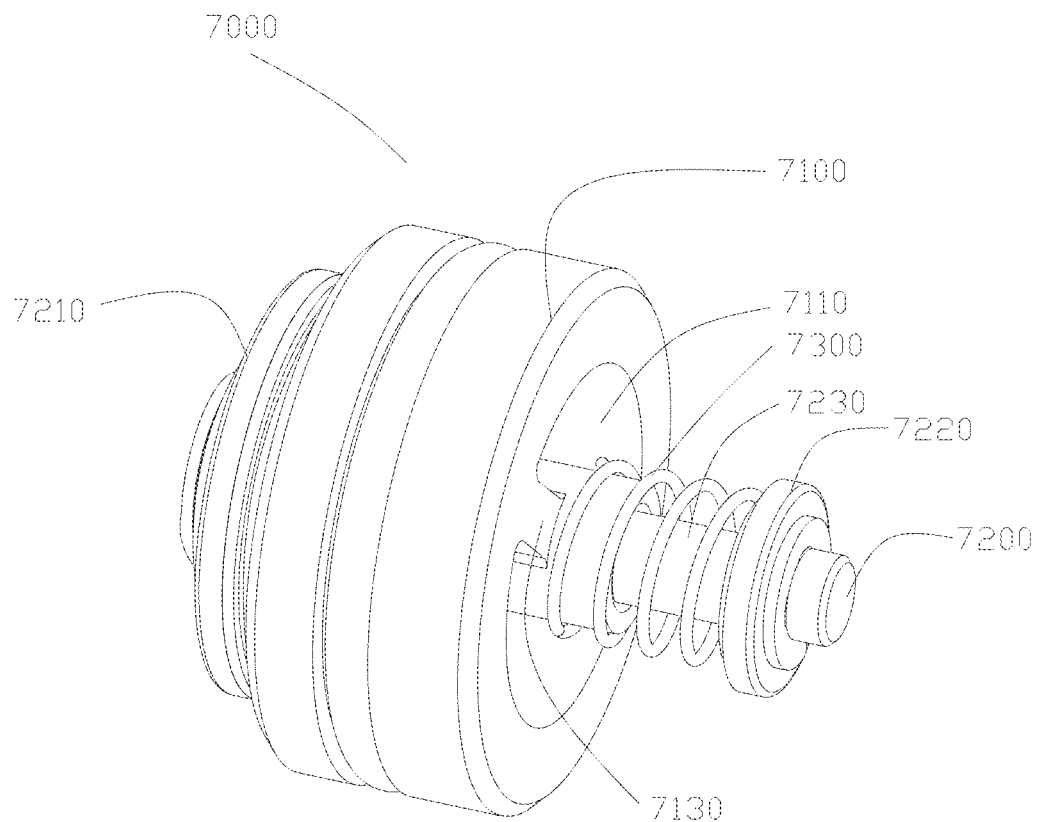
FIG. 14 is a schematic three-dimensional view of a check valve component.
Figure 15:
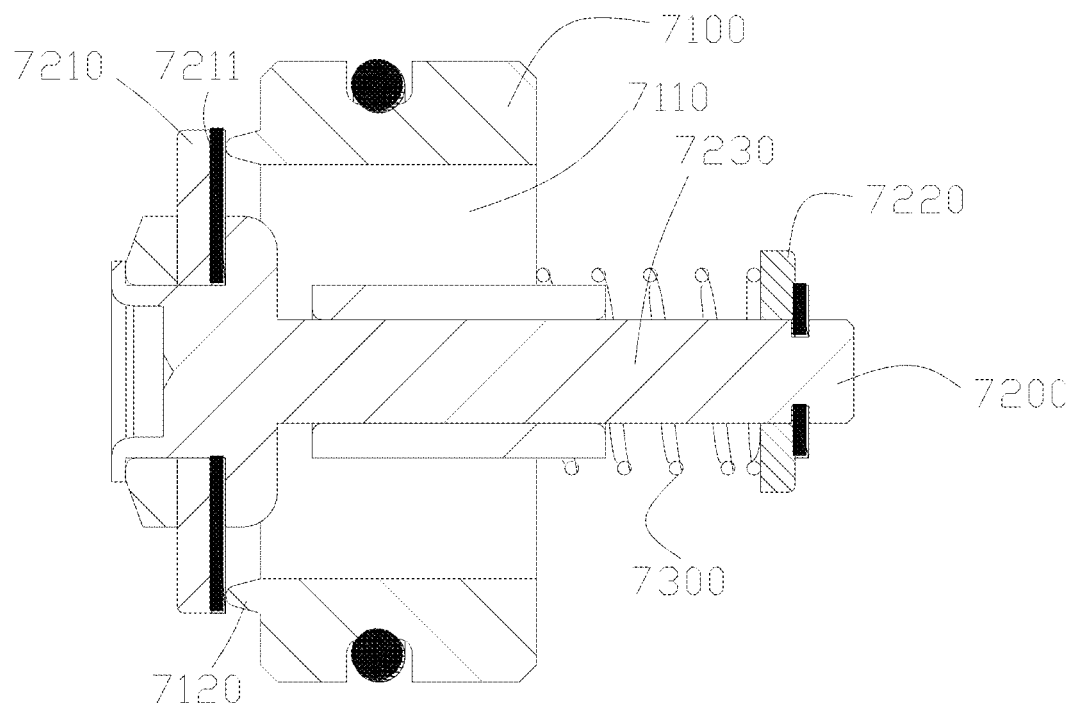
FIG. 15 is a schematic cross sectional view of FIG. 14.
Figure 16:
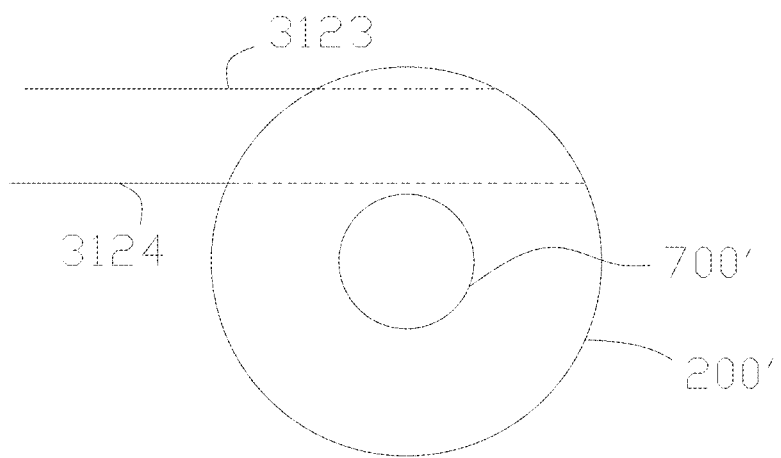
FIG. 16 is a schematic view showing the positional relationship between a first passage, a second chamber, a conduction pipe and a first cross section.

Referring to FIG. 16, a first cross section is defined, which is perpendicular to an axis of the conduction pipe 700, the axis of the first passage 3120 is located in the first cross section, and an intersecting line between a wall forming the first passage 3120 and the first cross section includes a first side line 3123 and a second side line 3124. An intersecting line between the side wall of the second chamber 200 and the first section is defined as a first loop line 200', an intersecting line between an outer wall of the conduction pipe 700 and the first section is defined as a second loop line 700', and the second side line 3124 is closer to the second loop line 700' than the first side line 3123. Along the radial direction of the first loop line 200', extension lines of both the first side line 3123 and the second side line 3124 are located on the same side of the second loop line 700', or in other words, along the radial direction of the first loop line 200', the second loop line 700' is not located between the extension line of the first side line 3123 and the extension line of the second side line 3124. Herein, a case that the extension line of the second side line 3124 is tangent to the first loop line, and a case that the extension line of the first side line 3123 is tangent to the first loop line 200' are also included. In this embodiment, both the first loop line 200' and the second loop line 700' are circular, and the first side line 3123 is parallel to the second side line 3124. It should be noted that the first loop line and the second loop line may be arc-shaped, rectangular or other shapes, and the first side line 3123 may not be parallel to the second side line 3124; the radial direction of the first loop line 200' refers to a direction pointing to the first loop line from the center or near-center area of the first loop line. In this way, the fluid discharged from the first passage 3120 is substantial spirally flowing in the second chamber 200, which extends the gas-fluid separation path, and is beneficial for gas-liquid separation. In addition, the first passage 3120 is not directly facing the conduction pipe 700, and the fluid discharged from the first passage 3120 does not directly impact the conduction pipe 700, and thus it is also beneficial for discharging gas and liquid in the conduction pipe 700, and it is not likely for the liquid fluid to be adhered to the outer wall of the conduction pipe 700. Referring to FIGS. 3, 13, and 12, the bottom wall of the second chamber 200 includes a first bottom wall 221 and a second bottom wall 222. The distance between the second bottom wall 222 and the first port 701 of the conduction pipe 700 is larger than a distance between the first bottom wall 221 and the first port 701 of the conduction pipe 700 in the axial direction of the conduction pipe 700, so that the liquid fluid is collected on the second bottom wall 222 after the gas-liquid separation to the fluid, which facilitates for the liquid fluid to be collected on the second bottom wall 222, and a discharge port is provided on the second bottom wall 222, which facilitates to the discharge of the liquid fluid; the first bottom wall 221 is higher than the second bottom wall 222, there is no or only a small amount of liquid fluid on the first bottom wall 221, the first port 701 of the conduction pipe 700 faces the first bottom wall 221. In addition, a projection of the entire first port 701 of the conduction pipe 700 is located within the first bottom wall 221 in the axial direction of the conduction pipe 700, which is beneficial to preventing the liquid fluid located in the bottom wall of the second chamber 200 from being sucked away by the conduction pipe 700. In addition, the first bottom wall 221 and the second bottom wall 222 may be formed integrally or separately. In this embodiment, the second bottom wall 222 is an annular wall. The third flow passage 500 has an opening in the outer wall of the valve body. The third flow passage 500 is provided with a first opening 501 of the third flow passage 500 on the wall of the second chamber 200, the first opening 501 is located on the second bottom wall 222, that is, a discharge port is provided on the second bottom wall 222, and the third flow passage 500 is in communication with the second chamber 200; the third flow passage 500 is provided with a second opening 3 of the third flow passage 500 in the outer wall of the valve body 3000, that is, the third communication port 3. The first sub-portion 230 is located between the first bottom wall 221 and the second bottom wall 222 in the axial direction of the conduction pipe 700.

Figure 18:
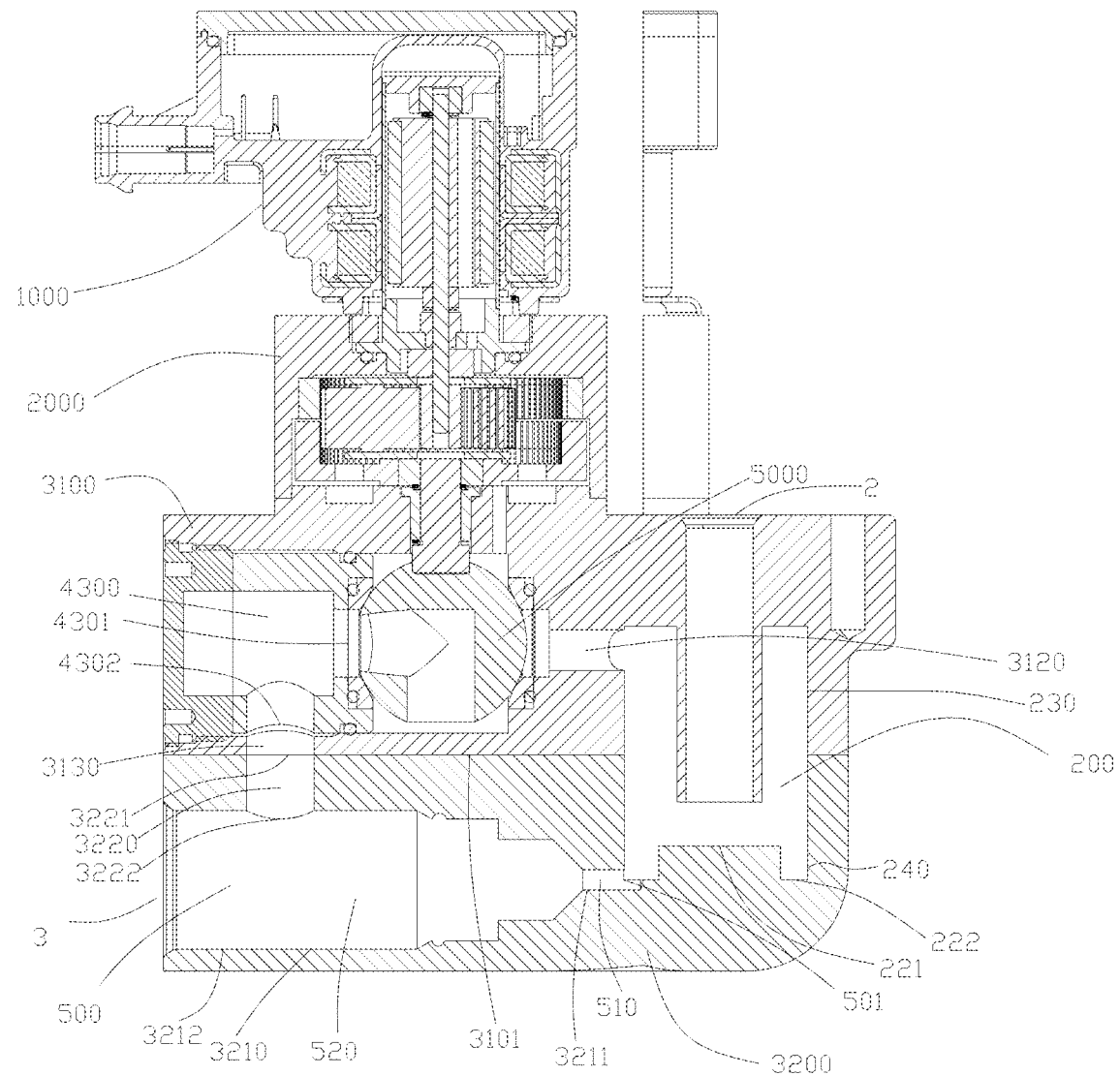
FIG. 18 is a schematic cross sectional view of a third embodiment taken along line A-A in FIG. 2.
Figure 19:
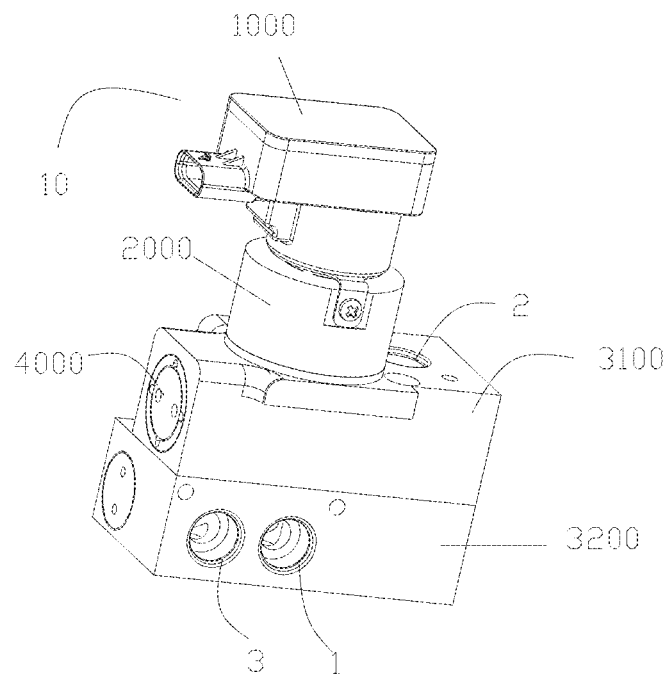
FIG. 19 is a schematic three-dimensional view of a second embodiment of the fluid management assembly.
Figure 20:
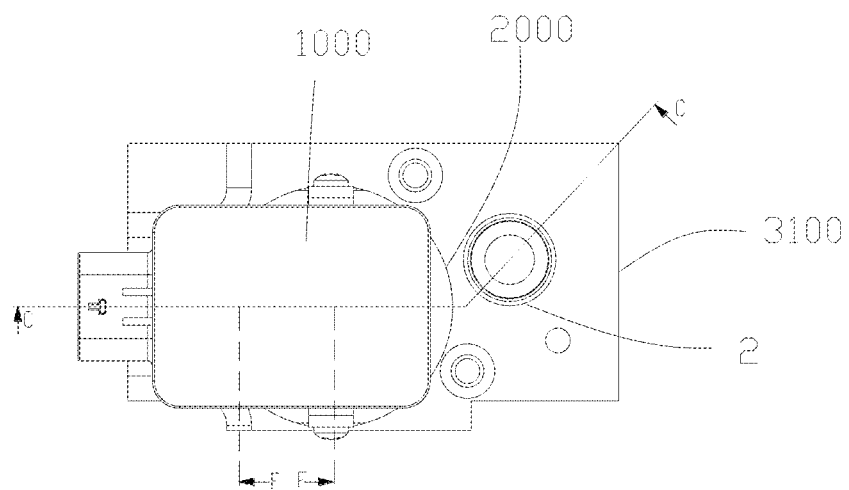
FIG. 20 is a schematic top structural view in FIG. 19.
Figure 21:
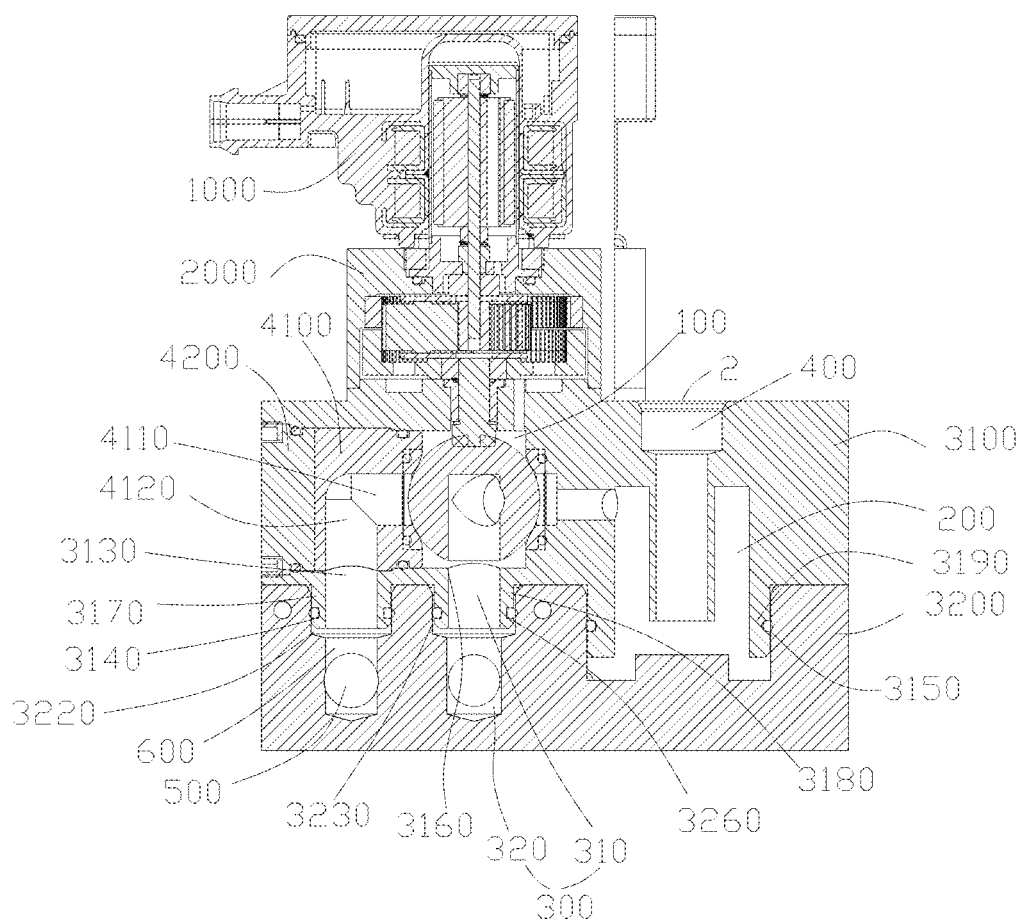
FIG. 21 is a schematic cross sectional view of a first embodiment taken along line C-C in FIG. 20.
Figure 22:
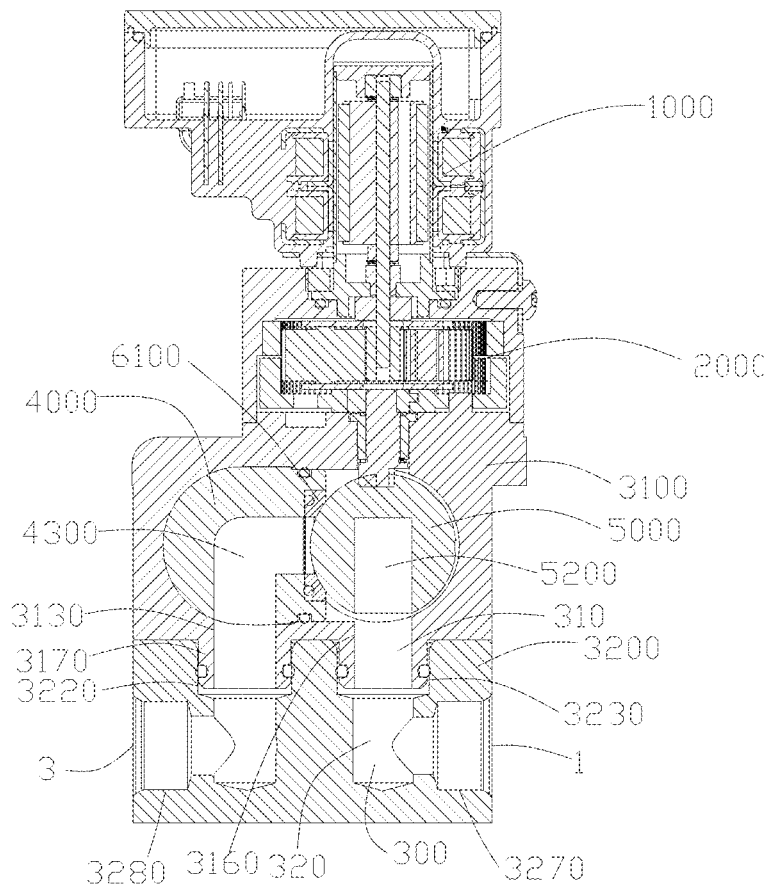
FIG. 22 is a schematic cross sectional view taken along line F-F in FIG. 20.

Referring to FIG. 18, the valve body 3000 includes a second opening portion 3210, the third flow passage 500 includes a chamber of the second opening portion 3210, and the third flow passage 500 further includes a communication portion 520 and a throttling portion 510. Accordingly, the second opening portion 3210 has a wall 3212 forming the communication portion and a wall 3211 forming the throttling portion. The third flow passage 500 is provided with a first opening 501 of the third flow passage 500 in the second bottom wall 222 or the first sub-portion 230 in the axial direction of the conduction pipe 700. In one technical solution of the present application, the communication portion 520 is provided with a second opening of the third flow passage 500 in the outer wall of the valve body 3000, the throttling portion 510 is provided with the first opening 501 of the third flow passage 500 in the side wall of the second chamber 200. Alternatively, the first opening 501 of the third flow passage 500 may be formed in the bottom wall of the second chamber 200 and/or in the first sub-portion 230. In a case that the first opening 501 of the third flow passage 500 is formed in the first sub-portion 230, the first opening of the third flow passage 500 should be as close as possible to the second bottom wall 222, so as to facilitate the liquid fluid to flow into the third flow passage 500. In other embodiments of the technical solution of the present application, the third flow passage 500 may not be provided with the throttling portion, and the third flow passage 500 only includes the communication portion 520. In that case, the third flow passage 500 only has a conduction function.

Referring to FIGS. 1, 3, 39, and FIGS. 12 and 13, the valve body 3000 includes a first valve body 3100 and a second valve body 3200. The transmission device 2000 is arranged fixed to the first valve body 3100, the first opening portion 3110, the first passage 3120, the first flow passage 300 and the second flow passage 400 are formed in the first valve body 3100, and at least part of the third flow passage 500 are formed in the second valve body 3200. With reference to FIG. 12 and FIG. 13, the first valve body 3100 includes a first wall 3101, the second valve body 3200 includes a second wall 3201, and the first wall 3101 is arranged in contact or with a gap to the second wall 3201. The term "being arranged with a gap" here means that a distance between the first wall 3101 and the second wall 3201 is less than or equal to 5 cm. In addition, if other components are provided between the first wall 3101 and the second wall 3201, it can be seen as "being arranged with a gap". The second chamber 200 includes a first sub-chamber 210 and a second sub-chamber 220. The first sub-chamber 210 is formed in the first valve body 3100, the second sub-chamber 220 is formed in the second valve body 3200, and the first sub-chamber 210 is arranged opposite to the second sub-chamber 220. The fluid management assembly 10 includes a first gap 3150 and a first sealing member, the first gap 3150 is formed as a groove and is located on the first wall 3101 and recessed from the first wall 3101. The first gap 3150 surrounds an opening of the sub-chamber 210 in the first wall 3101, or in other words, the opening of the sub-chamber 210 in the first wall 3101 is located inside the first gap 3150. The first sealing member is arranged in the first gap 3150. After the first valve body 3100 being mounted with the second valve body 3200, the first sealing member abuts against a wall of the first gap 3150 and the second wall 3201, respectively, so as to seal the second chamber 200, preventing the fluid in the second chamber 200 from leakage. Alternatively, the first gap 3150 may be formed on the second wall 3201, or formed on both the first wall 3101 and the second wall 3201, which will not be described in detail. In other embodiments, referring to FIGS. 23, 24 and 26, the first valve body 3100 includes an embedded portion 3190, an opening of the first sub-chamber 210 is formed in the embedded portion 3190, and the embedded portion 3190 protrudes relative to the first wall 3101. Correspondingly, the second valve body 3200 includes a step portion 3290, the step portion 3290 includes a step side wall 3291 and a step bottom wall 3292, the step side wall 3291 extends from the second wall 3201 toward the step bottom wall 3292, and the step bottom wall 3292 is parallel to the second wall 3201. The embedded portion 3190 is located at the step portion, and the first gap 3150 is provided between the embedded portion 3190 and the step portion. The fluid management assembly is provided with the first sealing member in the first gap 3150, so as to obtain the sealing between the embedded portion 3190 and the step portion and the sealing of the second chamber 200, thereby preventing the fluid in the second chamber 200 from leakage. Alternatively, the embedded portion 3190 may be arranged in the second valve body 3200, and the step portion may be arranged in the first valve body 3100, which will not be described in detail.

The first valve body 3100 includes a first through hole 3130, the first through hole 3130 is provided with a first opening of the first through hole 3130 in the wall of the first opening portion, the first through hole 3130 is provided with a second opening of the first through hole 3130 in the first wall 3101, and the first opening of the first through hole 3130 is arranged opposite to the second opening of the first through hole 3130, or in other words, the first opening of the first through hole 3130 is arranged opposite to the second opening of the first conduction passage 4300, and the first through hole 3130 is in communication with the first conduction passage 4300. The second valve body 3200 includes a second through hole 3220, the second through hole 3220 has a first opening of the second through hole 3220 in the second wall 3201, the second through hole 3220 has a second opening of the second through hole 3220 in the second opening portion 3210, the second through hole 3220 is in communication with a chamber formed by the second opening portion 3210, the first opening of the first through hole 3130 is arranged opposite to the first opening of the second through hole 3220, and the first through hole 3130 is in communication with the second through hole 3220.

The fluid management assembly 10 further includes the fourth flow passage, and the fourth flow passage can be in communication with the first chamber 100. In this embodiment, the fourth flow passage includes the passage 6110 of the first valve seat, the first communication passage 4300, the first through hole 3130 and the second through hole 3220, and an opening of the fourth flow passage is located in the wall 3212 of the communication portion, or in other words, the fluid in the fourth flow passage enters the third flow passage 500 and then is discharged through the third flow passage 500. Referring to FIG. 12 and FIG. 13, the fluid management assembly 10 further includes a second gap 3140 and a second sealing member, and the second sealing member is located in the second gap 3140, so as to obtain the sealing. In this embodiment, the second gap 3140 is formed as a groove, the second gap 3140 is located in the first wall 3101 and recessed from an end of the first wall 3101, and the second gap 3140 surrounds an outer circumference of the second opening of the first through hole 3130, or in other words, the second opening of the first through hole 3130 is located inside the second gap 3140. The second sealing member is arranged in the second gap 3140, and the second sealing member abuts against a wall of the second gap 3140 and the second wall 3201, respectively. The second sealing member may be a sealing ring or a solder, so as to prevent internal leakage. Alternatively, the second gap 3140 may be formed in the second wall 3201, or the second wall 3201 may be formed in the first wall 3101 and the second wall 3201, and the second gap 3140 of the first valve body 3100 may be arranged opposite to or staggered with the second gap 3140 of the second valve body 3200, which will not be described in detail.

Figure 23:
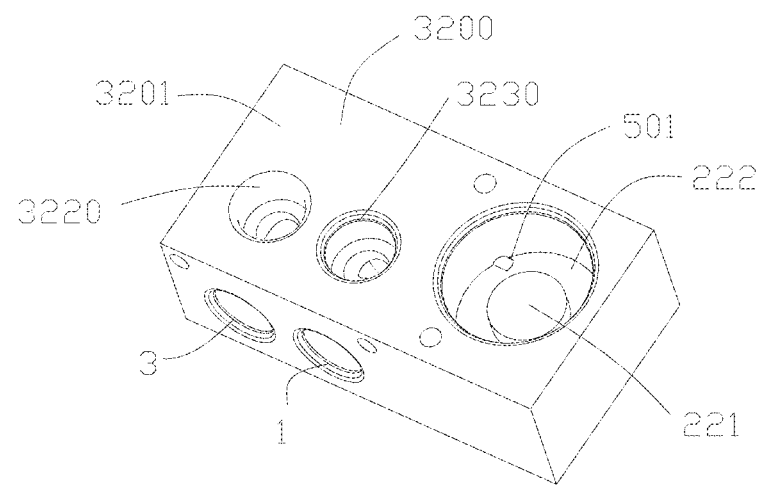
FIG. 23 is a schematic three-dimensional structural view of a second valve body in FIG. 19.
Figure 24:
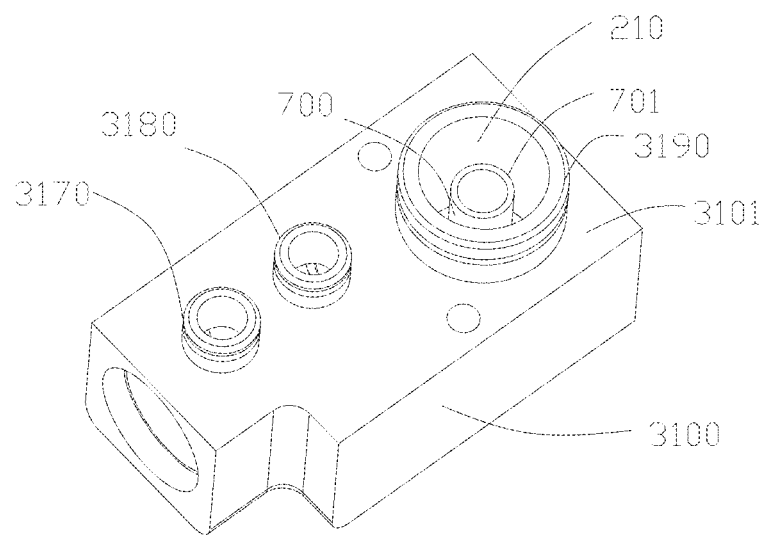
FIG. 24 is a schematic three-dimensional structural view of a first valve body in FIG. 19.
Figure 25:
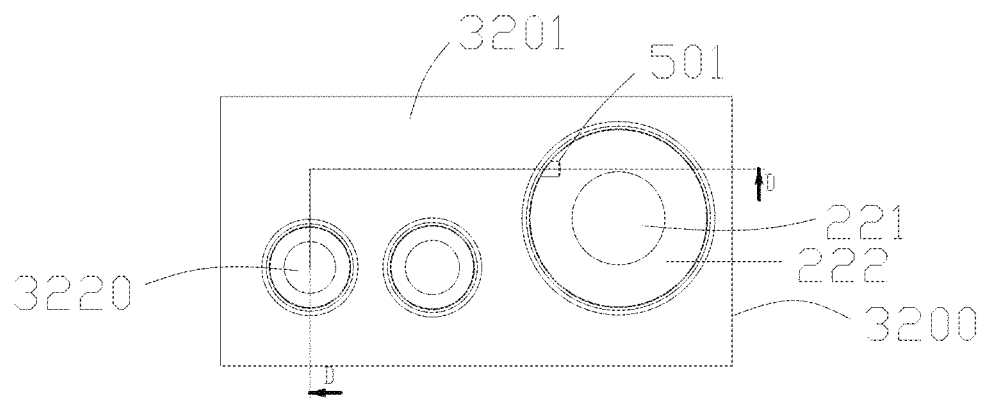
FIG. 25 is a schematic top view in FIG. 23.
Figure 26:
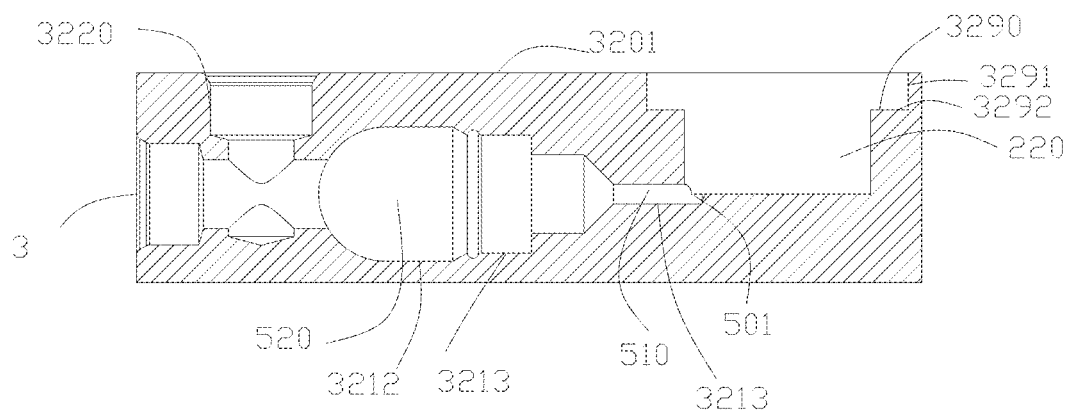
FIG. 26 is a schematic cross sectional view taken along line D-D in FIG. 24.

In other embodiments, referring to FIG. 23 and FIG. 24, the fluid management assembly 10 further includes a first connecting pipe 3170, the first connecting pipe 3170 is integrated with one of the first valve body 3100 and the second valve body 3200, such that one end of the first connecting pipe 3170 is located in the first through hole 3130 or the second through hole 3220 and a second gap 3140 is provided by one end of the first connecting pipe 3170 and the first through hole 3130 or the second through hole 3220, and the second sealing member is arranged in the second gap 3140, which facilitates the assembly and reduces the risk of leakage. In this embodiment, the first connecting pipe 3170 is integrated with the first valve body 3100. In other embodiments, the first connecting pipe 3170 is separately arranged with the first valve body 3100 and the second valve body 3200, one end of the first connecting pipe 3170 is located in the first through hole, and the other end of the first connecting pipe 3170 is located in the second through hole. A second gap is present between the first connecting pipe 3170 and the first through hole, and a second gap is provided between the first connecting pipe 3170 and the second through hole, the fluid management assembly 10 is provided with the second sealing member in the second gap 3140, so as to obtain the sealing between the first connecting pipe 317 and the first through hole and between the first connecting pipe 317 and the second through hole.

In order to fix the first valve body 3100 and the second valve body 3200, in this embodiment, a first mounting hole is provided in one of the first valve body 3100 and the second valve body 3200, and a first penetrating through hole is provided in the other one of the first valve body 3100 and the second valve body 3200, so as to cooperate with the first mounting hole. Generally, an axis of the first mounting hole is parallel to the axis of the conduction pipe 700. The fluid management assembly 10 further includes a first fastener, the first fastener extends into the first penetrating through hole and the first mounting hole, and the first fastener fastens the first valve body 3100 and the second valve body 3200. Under the action of the first fastener, the first wall closely abuts against the second wall, or the first wall closely abuts against the second wall by other members and then is fixed to the second wall by other fasteners, and the fasteners may include a component capable of fastening, such as a bolt, etc.

Figure 17:
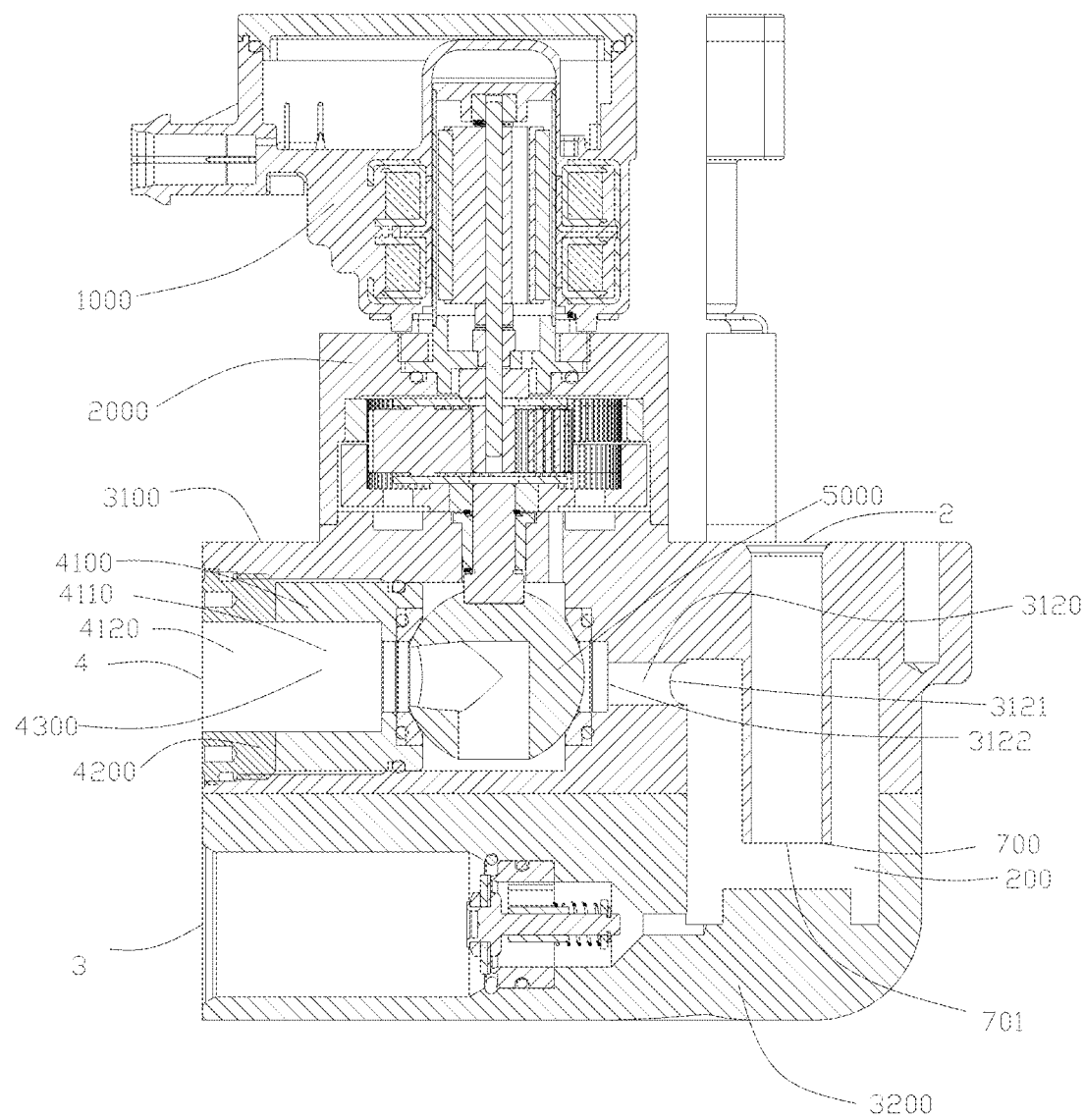
FIG. 17 is a schematic cross sectional view of a second embodiment taken along line A-A in FIG. 2.

Referring to FIG. 17, the first communication passage 4300 includes a chamber of the first hole 4110 and a chamber of the second hole 4120. The axis of the first hole 4110 coincides with the axis of the second hole 4120. Alternatively, the axis of the first hole 4110 may be arranged parallel to the axis of the second hole 4120. The chamber of the first hole 4110 is in communication with the chamber of the second hole 4120. The opening of the second hole 4120 is formed in the outer end wall 4010 of the valve bonnet, that is, an opening of the fourth flow passage in the outer end wall of the valve bonnet, or in other words, a fourth communication port 4, so that it is not necessary for the first through hole 3130 to provide the first valve body 3100, and the second through hole 3220 to provide the second valve body 3200, which facilitates mounting and reduces the internal leakage. In that case, the fourth flow passage 600 includes the passage of the first valve seat 6100 and the first conduction passage 4300, and it is not necessary for the fourth flow passage to share the common outlet with the third flow passage. In the case that the fluid management assembly is throttling and conducting simultaneously, the fluid in the third flow passage and the fluid in the fourth flow passage may not be mixed. In this embodiment, the fluid management assembly includes a first groove and a sealing member, the sealing member is located in the first groove, and the first groove is recessed relative to the side wall of the valve bonnet and distributed in a circumferential direction of the side wall of the valve bonnet, or the first groove is recessed relative to the first opening portion and distributed in a circumferential direction of the first opening portion. The fluid management assembly 10 includes a valve port portion and a second valve core, the third flow passage 500 includes a chamber formed by the valve port portion, or in other words, the chamber formed by the valve port portion is a part of the third flow passage 500, and the second valve core can abut against the valve port portion, so as to block the third flow passage 500. In this embodiment, referring to FIGS. 3, 14 and 15, the fluid management assembly 10 further includes a check valve component 7000, and the check valve component 7000 is arranged in the chamber formed by the second opening portion 3210. Specifically, the second opening portion 3210 is formed with a mounting portion 3213, and the mounting portion 3213 is located between the communication portion 520 and the throttling portion 510. The check valve component 7000 includes a valve supporting seat 7100 and a second valve core 7200, at least part of the valve supporting seat 7100 is located in a chamber formed by the mounting portion 3213, and the mounting portion 3213 is fixedly connected to the valve supporting seat 7100 and a connection between the mounting portion and the valve supporting seat 7100 is sealed. In a specific embodiment, the mounting portion 3213 is provided with an internal thread, a matching portion of the valve supporting seat 7100 is formed as an external thread, and the internal thread of the mounting portion 3213 cooperates with the external thread of the matching portion, so as to fix the check valve component 7000 with the second opening portion 3210. A groove for placing a sealing member is provided in the matching portion of the valve supporting seat 7100 or the mounting portion 3213, so as to obtain the sealing between the valve supporting seat 7100 and the mounting portion 3213. In other embodiments, the mounting portion 3213 has a step for restrict the valve supporting seat 7100 and a groove for placing a snap ring, and the step and the snap ring of the mounting portion 3213 realize the fixation of the valve supporting seat 7100. The valve supporting seat 7100 includes a valve core rod hole, a communication hole 7110 and a stop portion 7130, and the valve supporting seat 7100 is further provided with a valve port portion 7120. The valve port portion 7120 is located at a side of the valve supporting seat 7100 close to the communication portion 520, and the stop portion 7130 is located at a side of the valve supporting seat 7100 close to the throttling portion 510. Both the valve core rod hole and the communication hole 7110 extend through the valve supporting seat 7100 in an axial direction of the second opening portion 3210. The second valve core 7200 includes a valve core rod 7230, a first end 7210 and a second end 7220, and the first end 7210 and the second end 7220 are integrated with the valve core rod 7230 or welded to the valve core rod 7230 as a whole. Both the first end 7210 and the second end 7220 protrude relative to the valve core rod 7230 in the radial direction of the second opening portion 3210, or in other words, the outer diameters of the first end 7210 and the second end 7220 are greater than the outer diameter of the valve core rod 7230, the valve core rod 7230 is located in the valve core rod hole, and the valve core rod 7230 is slidable in the valve core rod hole. The first end 7210 and the second end 7220 are located on two sides of the valve supporting seat 7100, the first end 7210 is relatively adjacent to the communication portion 520, and the second end 7220 is relatively adjacent to the throttling portion 510. One end of an elastic member 7300 abuts against the second end 7220, and the other end of the elastic member 7300 abuts against the stop portion 7130. The check valve component 7000 is provided with the elastic member 7300, which facilitates the resetting of the second valve core 7200. In this embodiment, the elastic member 7300 is a spring. The first end 7210 has a first abutment area 7211, the communication hole 7110 is provided with a communication port on an outer end wall of the valve supporting seat 7100, and the valve port portion 7120 is distributed in a circumferential direction of the communication port. In other embodiments, the valve port portion 7120 may be formed as a wall of the communication portion. In the case that the fluid management assembly is in operation, when the a pressure of the throttling portion 510 is lower than a pressure of the communication portion 520, the second valve core 7200 is located at a first position, the first abutment area 7211 abuts against the valve port portion 7120, and the communication hole 7110 is not in communication with the communication portion 520, so that the third flow passage 500 is blocked, and when the pressure of the throttling portion 510 is higher than the pressure of the communication portion 520, the second valve core 7200 is located at a second position, the first abutment area 7211 is separated from the valve port portion 7120, the second end compresses the elastic member 7300, the stop portion stops the second valve core from further moving toward the communication portion, the second valve core 7200 opens the valve port portion 7120, the communication hole is in communication with the communication portion 520, so that the third flow passage 500 is conducting.

Referring to FIGS. 38 to 42 and 3, when the fluid management assembly 10 is in operation, the first valve core 5000 is rotatable in the first chamber 100, the operation position of the first chamber 100 at least includes a first operation position and a second operation position. In the technical solution of this embodiment, the first flow passage 300 serves as a passage for the fluid to enter the first chamber 100, and the fourth flow passage serves as one of the passages for the fluid to flow out of the first chamber 100. The fourth flow passage includes the passage 6110 of the first valve seat, the chamber of the first hole 4110, the chamber of the second hole 4120, a chamber of the first through hole 3130 and a chamber of the second through hole 3220. The first conduction passage 4300 includes the chamber of the first hole 4110 and the chamber of the second hole 4120; the first passage 3120 is another passage for the fluid to flow out of the first chamber 100, and the fluid in the first chamber 100 can enter the second chamber 200 through the first passage 3120. After the gas-liquid separation to the fluid in the second chamber 200, the second flow passage 400 serves as a passage for the gas to flow out of the second chamber 200, and the third flow passage 500 serves as a passage for the liquid to flow out of the second chamber 200. Specifically, referring to FIG. 40 and FIG. 3, the fluid enters the first chamber 100 through the first flow passage 300. In the first operation position of the first valve core 5000, the conduction passage 5200 of the first valve core is in communication with the passage 6110 of the first valve seat, the first valve core 5000 blocks the communication between the first chamber 100 and the passage of the second valve seat 6200, so that the second chamber 200 is not in communication with the first chamber 100, and the fluid in the first chamber 100 flows out of the first chamber 100 through the fourth flow passage, and thus enters the communication portion 520 of the third flow passage 500, and then is discharged from the fluid management assembly 10 through the communication portion 520, and the fluid management assembly 10 is only served as a passage of the fluid in this process. In the second operation position of the first valve core 5000, referring to FIG. 3 and FIG. 41, the first chamber 100 is in communication with the second chamber 200, the throttle passage 5100 of the first valve core 5000 is in communication with a passage between the first chamber 100 and the second valve seat 6000, the fluid in the first chamber 100 enters the second chamber 200 after being throttled by the throttle passage 5100, and the throttled fluid is gas-liquid separated in the second chamber 200, the gaseous fluid enters the second flow passage 400 through the conduction pipe 700 and is discharged out of the fluid management assembly 10, and the liquid fluid enters the third flow passage 500 through the first opening 501 of the third flow passage and is discharged out of the fluid management assembly 10 through the third flow passage 500. At this time, the fluid management assembly 10 performs the functions of throttling and gas-liquid separation. In a case that the third flow passage 500 further includes the throttling portion 510, the fluid management assembly 10 further performs the function of a secondary throttling to the fluid.

In other embodiments, the operation position of the first valve core 5000 of the fluid management assembly 10 further includes a third operation position and a fourth operation position. In the third operation position of the first valve core 5000, referring to FIG. 39 and FIG. 3, the first valve core 5000 causes the first chamber 100 being discommunicated with the passage of the second valve seat 6200, the throttle passage 5100 causes the first chamber 100 being in communicating with the passage 6110 of the first valve seat, an thus the first chamber 100 is in communication with the fourth flow passage through the throttle passage 5100. The fluid in the first chamber 100 enters the fourth flow passage after being throttled through the throttle passage 5100, then enters the communication portion 520 of the third flow passage 500, and then is discharged out of the fluid management assembly 10 through the communication portion 520. The fourth flow passage includes the passage 6110 of the first valve seat, the chamber of the first hole 4110, the chamber of the second hole 4120, the chamber of the first through hole 3130 and the chamber of the second through hole 3220. In the fourth operation position of the first valve core 5000, referring to FIG. 42 and FIG. 3, the first valve core 5000 causes the first chamber 500 being discommunicated with the passage 6110 of the first valve seat, the throttle passage 5100 causes the first chamber 100 being in communicating with the passage of the second valve seat 6200, and thus the first chamber 100 is in communication with the second chamber 200, and then the fluid entering the second chamber 200 is gas-fluid separated, the gaseous fluid is discharged out of the fluid management assembly 10 through the second flow passage 400, and the liquid fluid is discharged out of the fluid management assembly 10 through the third flow passage 500. At this time, the fluid management assembly 10 performs the function of throttling and gas-liquid separation. In a case that the third flow passage 500 further includes the throttling portion 510, the fluid management assembly 10 further performs the function of a secondary throttling to the fluid.

Figure 27:
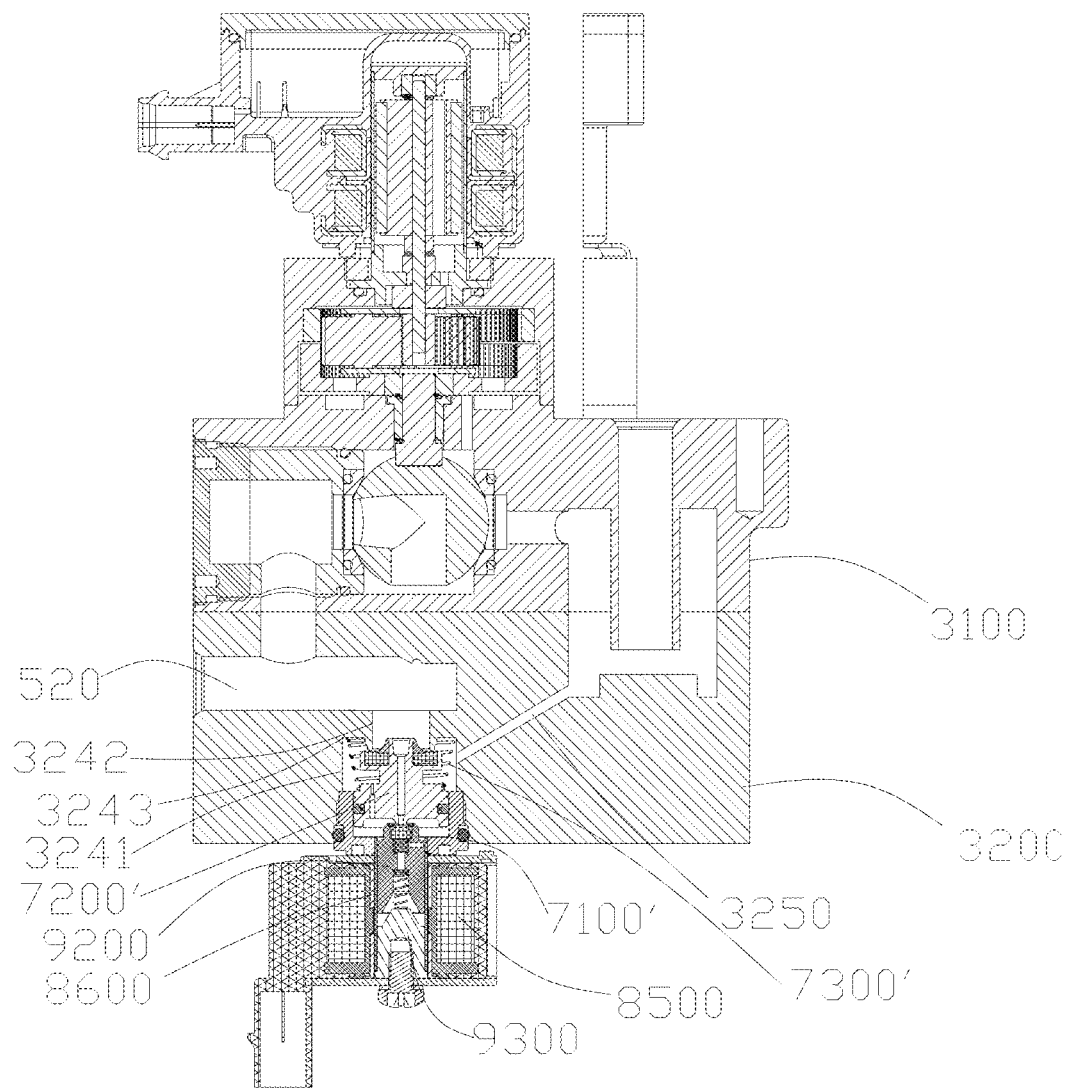
FIG. 27 is a schematic cross sectional view of a third embodiment of the fluid management assembly.
Figure 28:
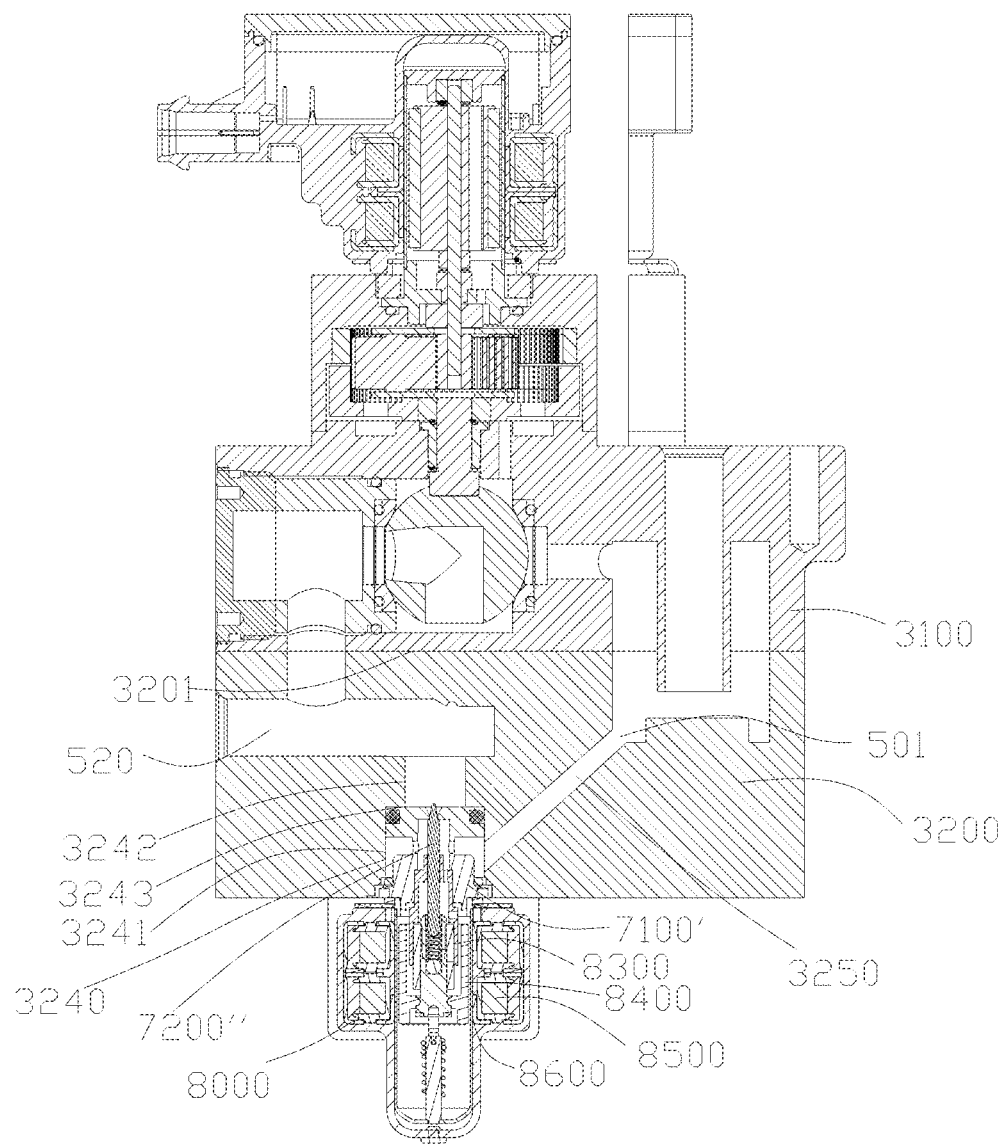
FIG. 28 is a schematic cross sectional view of a fourth embodiment of the fluid management assembly.

Referring to FIG. 27 and FIG. 28, the second valve body 3200 includes a third opening portion 3240, and the third opening portion 3240 is recessed relative to a wall of the second valve body 3200. In this embodiment, the third opening portion 3240 is recessed from a wall of the second valve body toward the second wall 3201, the third opening portion 3240 includes a large-diameter portion 3241, a small-diameter portion 3242 and a flat portion 3243, the flat portion 3243 connects the large-diameter portion 3241 and the small-diameter portion 3242, and the small-diameter portion 3242 has an opening in the wall of the communication portion 520. In this embodiment, the third flow passage 500 includes a second passage 3250, the second passage 3250 is provided with a first opening 501 of the third flow passage 500 in the wall of the second chamber 200, the second passage 3250 has an opening on the third opening portion, the second passage 3250 causes the chamber formed by the second chamber 200 being in communication with the chamber formed by the third opening portion 3240, and an axis of the second passage 3250 is arranged inclined relative to the axis of the conduction pipe. Referring to FIG. 27, at least part of the second passage 3250 is formed as a throttling portion, an equivalent diameter of the throttling portion is about 1.4 mm, or it may be other sizes, as long as it can realize the function of fluid throttling. The fluid management assembly further includes a solenoid valve portion and a valve chamber, the solenoid valve portion includes a valve supporting seat 7100' and a sleeve portion 8600, the valve supporting seat 7100' includes a center hole extending through the valve supporting seat, one end of the valve supporting seat 7100' is fixedly connected to the third opening portion 3240 and the connection between the valve supporting seat 7100' and the third opening portion 3240 is sealed, and the manner of fixing may be welding or screw fixing. The solenoid valve portion further includes a second valve core 7200' and an elastic member 7300'. In this embodiment, the second valve core 7200' is a piston, the piston has a piston hole, and the piston is slidable in the valve chamber. In this embodiment, a wall forming the valve chamber includes a partial wall of the large-diameter portion 3241 and a wall of the valve supporting seat 7100'. The valve supporting seat 7100' includes a guiding wall, at least part of the piston is located in a chamber formed by the guiding wall, the guiding wall of the valve supporting seat 7100' is slidably connected to a side wall of the piston, and the other part of the piston is located in a chamber defined by the large-diameter portion 3241. One end of the elastic member 7300' abuts against the flat portion 3243, and the other end of the elastic member 7300' abuts against the piston. The fluid management assembly 10 further includes a coil assembly 8500 and an iron core assembly. The iron core assembly includes a moving iron core 9200, a static iron core 9300 and a sleeve portion 8600, and one end of the sleeve portion is located in a center hole of the valve supporting seat 7100' and is sealingly fixed to a hole wall of the center hole of the valve supporting seat 7100'. At least part of the static iron core 9300 is located in the sleeve portion and fixed to the sleeve portion, at least part of the moving iron core 9200 is located in the sleeve portion and is movable relative to the static iron core 9300, and the moving iron core 9200 can relatively seal the piston hole. The static iron core 9300 is farther away from the valve supporting seat 7100' than the moving iron core 9200, and the coil assembly 8500 is sleeved on an outer circumference of the sleeve portion 8600. When the fluid management assembly is in operation, after the coil assembly 8500 being energized, the excitation magnetic field generated by the coil assembly 8500 can drive the moving iron core 9200 to move, the moving iron core 9200 abuts against the piston and relatively seals the piston hole, the piston moves toward the valve port portion, and the piston seals the valve port portion, so that the communication portion 520 is not in communication with the second chamber 200. In this embodiment, the valve port portion is the flat portion 3243 or a wall of the small-diameter portion 3242. When the fluid flows out of the second chamber through the third flow passage, the second passage generates a throttling effect, and the solenoid valve portion opens the third flow passage. In other situations, when the pressure of the communication portion is higher than the pressure of the throttling portion, the solenoid valve is closed.

Referring to FIG. 28, compared with the technical solution shown in FIG. 27, the difference is in that: the second passage 3250 is formed as the communication portion 520 or a part of the communication portion 520, an equivalent diameter of the second passage is about 3 mm, or may be other sizes. In this embodiment, the second valve core 7200" is a valve needle, or may be other forms of valves. The fluid management assembly 10 further includes a transmission mechanism 8300, a rotor portion 8400 and a valve core guiding portion. In this embodiment, the transmission mechanism 8300 is a thread-driving transmission mechanism, the thread-driving transmission mechanism includes a movable portion and a fixed portion, one of the movable portion and the fixed portion includes a screw rod, and the other one includes a nut threaded with the screw rod, the movable portion is assembled with the valve needle, and the fixed portion can be directly or indirectly fixed to the valve seat. The valve core guiding portion is relatively fixed to the valve supporting seat 7100" and can guide the second valve core 7200", so as to prevent an axial movement of the second valve core 7200" from deviating. The valve port portion is formed on the valve supporting seat 7100" and may be formed on the valve core guiding portion in other embodiments. Alternatively, the valve port portion may be formed on the small-diameter portion 3242, and the second valve core 7200" is substantially coaxial with the valve port portion. When the fluid management assembly 10 is in operation, the coil assembly 8500 is electrically connected to a control circuit which controls the coil assembly 8500. When the coil assembly 8500 is energized, the excitation magnetic field generated by the coil assembly 8500 can drive the rotor portion 8400 to rotate, and thus drive the valve needle to move by the thread-driving transmission mechanism 8300. When the rotor portion 8400 rotates, the screw rod is driven by the rotor portion 8400 to rotate relative to the nut due to the effect of pitch, so as to obtain the rotation and axial movement. In addition, the valve needle is relatively fixed to the screw rod, so that the valve needle can move axially with the screw rod, and a gap between the valve needle and the screw rod becomes larger or smaller, and the throttling to refrigerant is obtained. It can be known that a gap between the second valve core 7200" and the valve port portion is formed as a throttling portion. Alternatively, the transmission mechanism 8300 may be a gear-driving transmission mechanism 8300, the second valve core may have a structure of spherical or quasi-spherical, and the movement of the second valve core relative to the valve seat or a connecting body may be a relative rotation.

Figure 29:
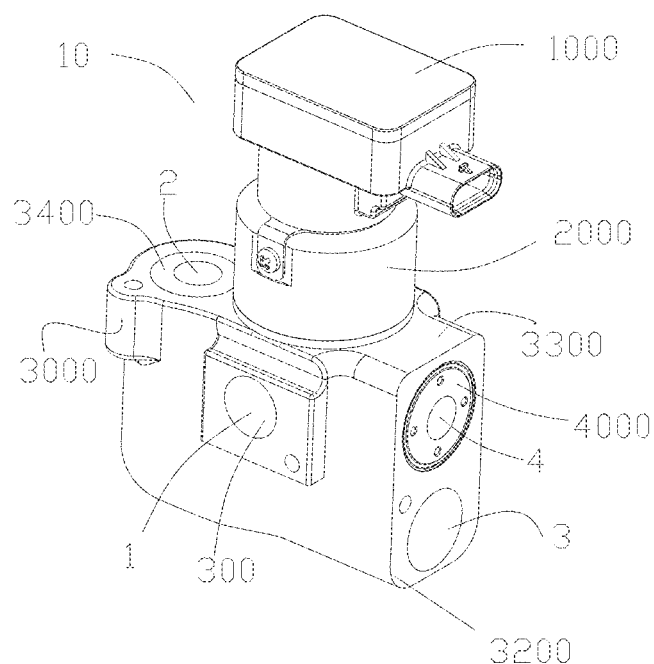
FIG. 29 is a schematic three-dimensional structural view of a fifth embodiment of the fluid management assembly.
Figure 30:
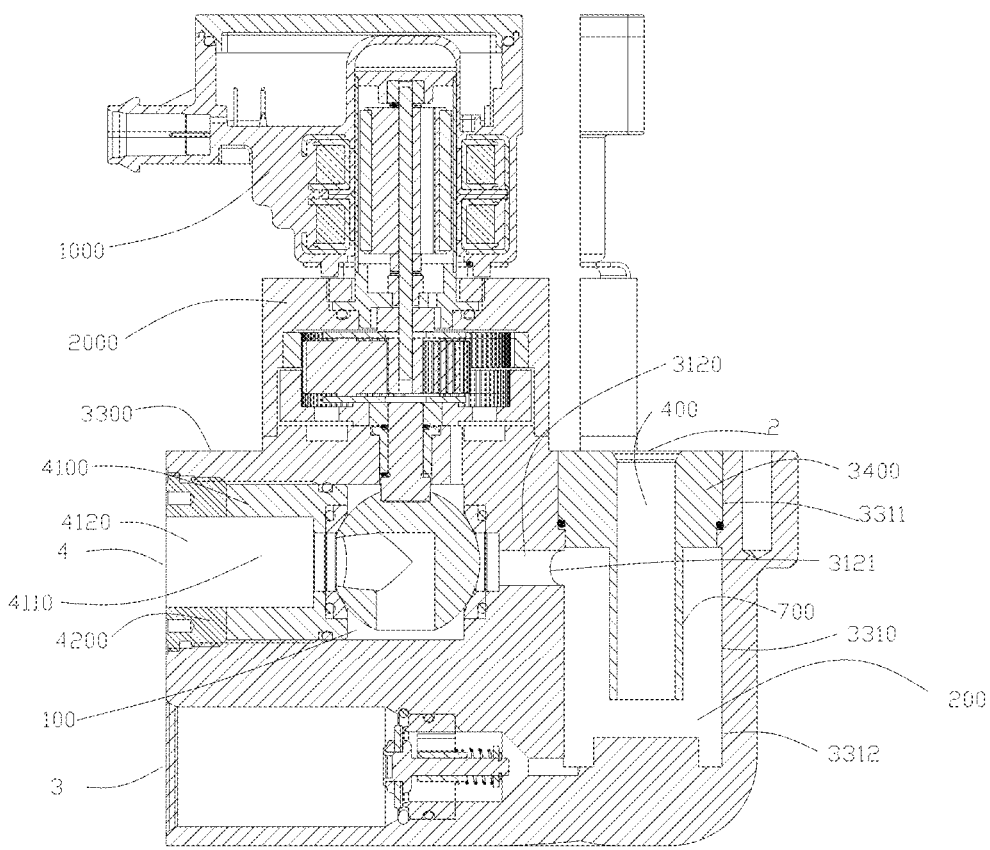
FIG. 30 is a schematic cross sectional view of FIG. 29.

Referring to FIG. 29 and FIG. 30, compared with the embodiment shown in FIG. 17, the valve body 3000 includes a main body 3300 and a block body 3400, the main body 3300 includes the first opening portion 3110, the second opening portion 3210 and the first flow passage 300 and the first passage 3120. The first flow passage 300 is provided with the first communication port 1 in an outer wall of the main body 3300. The main body 3300 includes a fourth opening portion 3310, the fourth opening portion 3310 is recessed from an upper wall of the main body 3300 toward an interior of the main body 3300, the fourth opening portion 3310 has an opening in the upper wall of the main body 3300, and the fourth opening portion 3310 includes a mounting wall 3311 and a side wall 3312 of the second chamber. Herein, the mounting wall 3311 is relatively close to the opening of the fourth opening portion, and the first passage 3120 is provided with the first opening 3121 of the first passage 3120 in the side wall 3312 of the second chamber. The second flow passage extends through the block body 3400, the block body 3400 has a matching wall, and the matching wall of the block body 3400 is sealingly fixed to the mounting wall 3312. Specifically, the matching wall of the block body 3400 has an external thread, the mounting wall is provided with an internal thread, and the external thread of the block body 3400 cooperates with the internal thread of the mounting wall, so as to realize the fixation of the block body 3400 and the main body 3300. A gap is provided between the block body 3400 and the mounting wall, and a sealing member is provided in the gap, so as to realize the sealing between the block body 3400 and the mounting wall. The conduction pipe 700 is integrated with the block body 3400, or the block body 3400 may be separately arranged with the conduction pipe 700. In this embodiment, the valve bonnet 4000 includes the first communication passage 4300, the first communication passage 4300 has the opening in the inner end wall of the valve bonnet 4000 and has a fourth communication port 4 in an outer end wall 4010 of the valve bonnet. In another embodiment, the fourth opening portion is recessed from a lower wall of the main body 3300 toward the interior of the main body, the fourth opening portion 3310 has an opening in the lower wall of the main body 3300, an inner wall of the block body 3400 is formed as the bottom wall of the second chamber, a bottom wall of the fourth opening portion is formed as the top wall of the second chamber, and the second flow passage is formed in the main body. Compared with the solution shown in FIG. 3, the valve body includes the main body 3300 and the block body 3400, and the processing and assembly are relatively simple.

Referring to FIGS. 19 to 26, the difference from the technical solution shown in FIG. 3 is in that: the first communication port 1 is formed in the second valve body 3200, the opening of the first flow passage 300 in the wall of the first chamber 100 is located in a lower side of the first valve core 5000, that is, in a side opposite to the valve stem 2300, which can reduce the lateral impact of the fluid ton the first valve core 5000, and is beneficial for maintaining the stability of the first valve core 5000. Specifically, the first flow passage 300 includes a first sub flow passage 310 and a second sub flow passage 320. Herein, the first sub flow passage 310 is located in the first valve body 3100, the second sub flow passage 320 is located in the second valve body 3200, the first sub flow passage 310 has openings in both the first wall 3101 and the first opening portion 3110, the first sub flow passage 310 is provided with a first opening of the first sub flow passage 310 in the first wall 3101, the first sub flow passage 310 is provided with a second opening of the first sub flow passage 310 in the wall of the first chamber 100, the second opening of the first sub flow passage 310 and the valve stem 2300 are located on the two sides of the first valve core 5000, the first sub flow passage is in communication with the first chamber 100. In that case, when the fluid in the first flow passage enters the first chamber, the lateral impact to the first valve core is reduced, which is beneficial to the stability of the first valve core. The term "lateral" here refers to a direction perpendicular to the valve stem. The second sub flow passage 320 is provided with a first opening of the second sub flow passage 320 in the second wall 3201, and the second sub flow passage 320 also has an opening in an outer wall of the second valve body 3200. In this embodiment, the first valve body 3100 includes a first hole portion 3160, a chamber of the first hole portion 3160 is formed as part of the first sub flow passage 310, the second valve body 3200 includes a second hole portion 3230, a wall forming the second sub flow passage 320 includes the second hole portion 3230 and a third hole portion 3270, and the second hole portion 3230 is recessed from the second wall 3201 toward the interior of the second valve body 3200, or in other words, a chamber formed by the second hole portion 3230 is formed as the first opening of the second sub flow passage 320 in the second wall 3201. The third hole portion 3270 has an opening in a side wall of the second valve body, and the chamber formed by the second hole portion 3230 is in communication with a chamber formed by the third hole portion 3270. In this embodiment, an axis of the second hole portion 3230 is perpendicular to an axis of the third hole portion 3270, or the axis of the second hole portion 3230 may form a different included angle with the axis of the third hole portion 3270. The fluid management assembly includes a third gap 3260 and a third sealing member, and the third sealing member is located in the third gap 3260. The fluid management assembly includes a second connecting pipe 3180, the second connecting pipe 3180 is integrated with the first valve body 3100, one end of the second connecting pipe 3180 is located in the chamber formed by the second hole portion 3230, the third gap 3260 is formed by the second hole portion 3230 and the second connecting pipe, and the second connecting pipe 3180 is integrated with the first valve body 3100, which facilitates assembly and reduces the risk of leakage. Alternatively, the second connecting pipe 3180 may be integrated with the second valve body 3200, which will not be described in detail. In other embodiments, one end of the second connecting pipe 3180 is located in the first hole portion 3160, the other end of the second connecting pipe is located in the second hole portion 3230, a third gap is provided between the second connecting pipe 3180 and the first hole portion 3160, and a third gap 3260 is provided between the second connecting pipe 3180 and the second hole portion 3230, and the fluid management assembly 10 is provided with the sealing members in the third gaps 3260, so as to obtain the sealing between the second connecting pipe 3180 and the first hole portion 3160 and between the second connecting pipe 3180 and the second hole portion 3230. It can be known that the fluid management assembly 10 may not include the second connecting pipe, the third gap 3260 is formed as a groove to be recessed relative to the first wall, and the third gap 3260 surrounds an outer circumference of the first opening of the first hole portion 3160, or in other words, the first opening of the first hole portion 3160 is located inside the third gap 3260. The third sealing member is provided in the third gap 3260, and the third sealing member abuts against a wall of the third gap 3260 and the second wall 3201, respectively. The third sealing member may be a sealing ring or a solder, so as to prevent internal leakage. Alternatively, the third gap 3260 may be formed in the second wall 3201, or the third gap 3260 may be both formed in the first wall 3101 and the second wall 3201. The third gap 3260 of the first valve body 3100 may be arranged opposite to or staggered with the third gap 3260 of the second valve body 3200, which will not be described in detail. The second valve body further includes a fourth hole portion 3280, the fourth hole portion 3280 is provided with the third communication port 3 in the outer wall of the second valve body 3200, an axis of the fourth hole portion 3280 is perpendicular to the axis of the second opening portion 3210, and a chamber formed by the fourth hole portion 3280 is in communication with the chamber formed by the second opening portion 3210. Accordingly, the fluid management further is provided with a plug in the fourth opening portion, so as to prevent the fluid from flowing out of the opening of the second opening portion. In this embodiment, the third communication port 3 and the first communication port 1 are located on the same outer wall of the second valve body, which facilitates the communication between the fluid management assembly and other components. The third flow passage includes the chamber formed by the second opening portion 3210 and the chamber formed by the fourth hole portion 3280. The chamber formed by the fourth hole portion 3280 is in communication with the chamber formed by the second through hole 3220, so that the fourth flow passage is in communication with the third flow passage.

Figure 31:
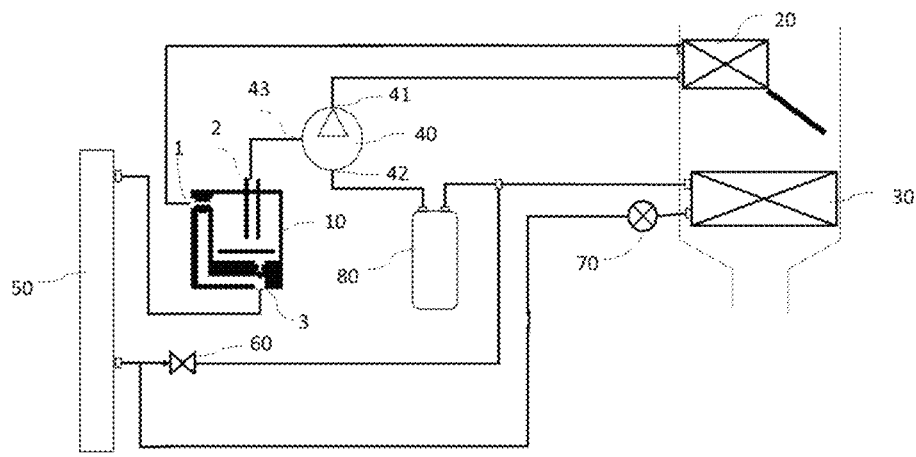
FIG. 31 is a schematic view showing the connection in a first embodiment of a thermal management system.

A thermal management system will be described below. Referring to FIG. 31, in a specific embodiment of the thermal management system, a vehicle thermal management system is taken as example, and the fluid in the thermal management system is generally a refrigerant. The thermal management system includes a compressor 40, a fluid management assembly 10, a first heat exchanger 20 and a second heat exchanger 50. The compressor 40 includes an outlet 41, a first inlet 42 and a second inlet 43. The first inlet 42 is a low-pressure inlet, and the second inlet 43 is a relatively high-pressure inlet. The first heat exchanger 20 can be in communication with the outlet 41 of the compressor, and a refrigerant in high-temperature and high-pressure releases heat in the first heat exchanger 20 to heat gas flowing through the first heat exchanger 20, which increases the temperature of the air flow. The second heat exchanger 50 is arranged at a front end of a vehicle, and the front end of the vehicle herein refers to a position of the second heat exchanger 50 capable of exchanging heat with ambient air. Specifically, the refrigerant can release heat to or absorb heat from the ambient air in the second heat exchanger 50, and the second heat exchanger 50 can exchange heat with the ambient air. The thermal management system further includes a third heat exchanger 30, and a throttling unit 70 is arranged in front of a refrigerant inlet of the third heat exchanger 30. The refrigerant absorbs the heat of the airflow flowing through the third heat exchanger 30 after throttling to the refrigerant by the throttling unit 70, which reduces the temperature of the airflow. The first heat exchanger 20 and the third heat exchanger 30 are arranged in an air duct of an air-conditioning case of the vehicle, and the first heat exchanger 20 is arranged in a downwind direction of the third heat exchanger 30. When the thermal management system is in operation, the refrigerant in the first heat exchanger 20 and the refrigerant in the third heat exchanger 30 exchange heat with the airflow in the air-conditioning case, which adjusts the temperature of the airflow in the air-conditioning case, and thus adjusts the temperature of a passenger compartment. The structure and description of the fluid management assembly 10 can make reference to FIGS. 1 to 30 and the above description, which will not be described in detail. Referring to FIGS. 31, 3 and 39, in the technical solution of the this embodiment, a refrigerant outlet of the first heat exchanger 20 is in communication with the first communication port 1 of the fluid management assembly, the second inlet 43 of the compressor is in communication with the second communication port 2 of the fluid management assembly 10, a first port of the second heat exchanger 50 is in communication with the third communication port 3 of the fluid management assembly 10, and a second port of the second heat exchanger 50 can be in communication with the first inlet 42 of the compressor 40 or with the first inlet 42 of the compressor 40 through a gas-liquid separator 80. In this embodiment, the thermal management system is provided with a shut-off valve 60, the shut-off valve 60 is arranged between the second port of the second heat exchanger 50 and the first inlet 42 of the compressor, so as to control the second port of the second heat exchanger 50 to be or not in communication with the first inlet 42 of the compressor. The second port of the second heat exchanger 50 can also be in communication with the third heat exchanger 30 by the throttling unit 70, and a refrigerant outlet of the third heat exchanger 30 is in communication with the first inlet 42 of the compressor or in communication with the first inlet 42 of the compressor by the gas-liquid separator 80. The thermal management system further includes a temperature flap. In a direction of the airflow, the temperature flap is arranged between the first heat exchanger 20 and the second heat exchanger 50, and the temperature flap can open or close or adjust a heat exchange area of the first heat exchanger 20, so as to control the heat exchange amount of the first heat exchanger 20.

Figure 33:
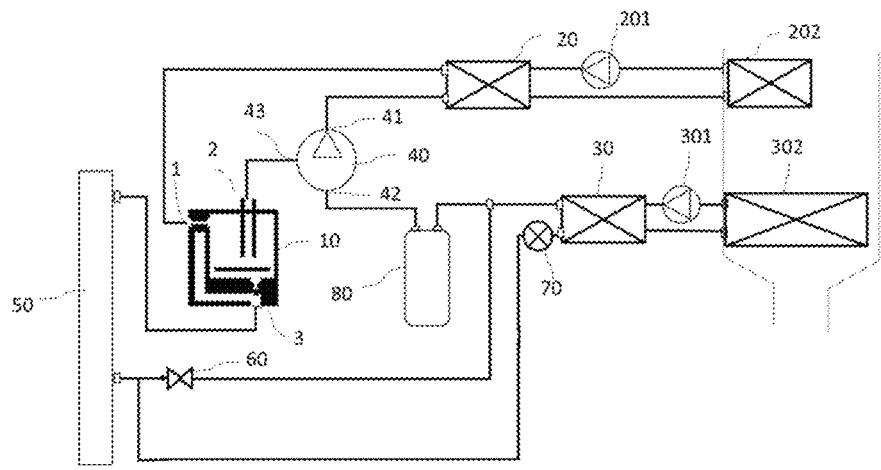
FIG. 33 is a schematic view showing the connection in a third embodiment of the thermal management system.

In other embodiments, the thermal management system further includes a refrigerant system, a first coolant system and/or a second coolant system. The first heat exchanger 20 and/or the second heat exchanger 50 are/is a dual-passage heat exchanger, one of the flow passages is a refrigerant flow passage, and the refrigerant flow passage is a part of the refrigerant system, and the other one of the flow passages is a coolant flow passage. The first coolant system includes a coolant flow passage of the first heat exchanger 20, a first pump 201 and a fourth heat exchanger 202, the coolant flow passage of the first heat exchanger 20, the first pump 201 and the fourth heat exchanger 202 are communicated in series, and the fourth heat exchanger 202 is located in the air duct of the air-conditioning case. The second coolant system includes a coolant flow passage of the third heat exchanger 30, a second pump 301 and a fifth heat exchanger 302, the coolant flow passage of the third heat exchanger 30, the second pump 301 and the fifth heat exchanger 302 are communicated in series, and the fifth heat exchanger 302 is located in the air duct of the air-conditioning case. Taking the first coolant system as an example, the refrigerant of the refrigerant system heat exchanges with the coolant of the first coolant system in the first heat exchanger 20, so as to adjust the temperature of the coolant of the first coolant system, and the coolant of the first coolant system exchanges heat with the airflow in the air-conditioning case in the fourth heat exchanger 202, so as to adjust the temperature of the airflow in the air-conditioning case, and thus adjust the temperature of the passenger compartment. Similarly, the technical solution related to the second coolant system is the same as describe above, which will not be described in detail. Referring to FIG. 33, the embodiment shown in FIG. 33 is a case where the thermal management system includes the refrigerant system, the first coolant system and the second coolant system. In this embodiment, the fourth heat exchanger 202 is arranged in a downwind direction of the fifth heat exchanger 302, and the first pump 201 and the second pump 301 are configured to control whether the first coolant system and the second coolant system are involved in heat exchanging.

Figure 34:
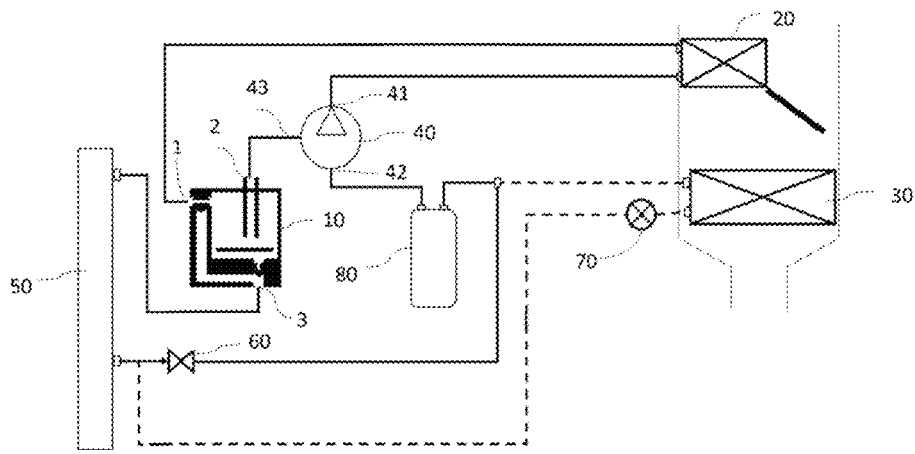
FIG. 34 is a schematic view showing the operation in a first heating mode of the thermal management system in FIG. 31.
Figure 41:
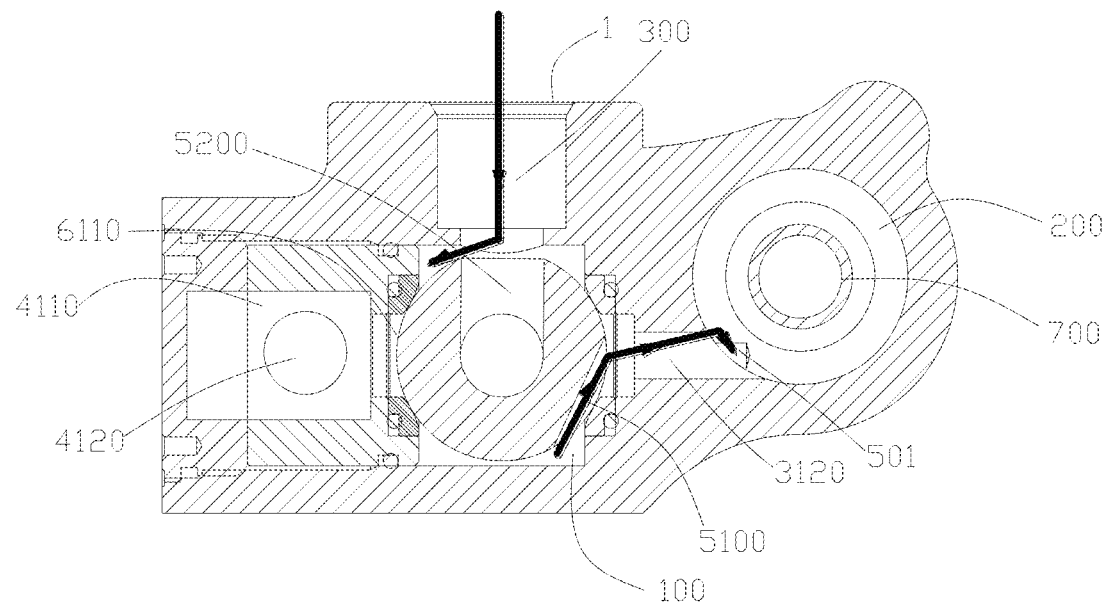
FIG. 41 is a schematic cross sectional view taken along line E-E in FIG. 38, in which the first valve core is located in a second operation position.

The thermal management system includes a heating mode and a cooling mode, and the heating mode includes at least one of a first heating mode, a second heating mode and a third heating mode. Referring to FIG. 34 and FIG. 41, in the first heating mode of the thermal management system, the first valve core is in the second operation position, that is, the first chamber 100 is in communication with the second chamber 200. Specifically, the first chamber 100 is in communication with the second chamber 200 through the throttle passage 5100. The refrigerant with high-temperature and high-pressure releases heat in the first heat exchanger 20, and the refrigerant which releases heat in the first heat exchanger 20 enters the first flow passage 300 through the first communication port 1 and then enters the first chamber 100 through the first flow passage 300. Due to the throttling in the throttle passage 5100, the gas-liquid mixed refrigerant is gas-liquid separated in the second chamber 200, the gaseous refrigerant flows through the second flow passage 400, enters the second inlet 43 of the compressor through the second communication port 2, and then is involved in the next circulation. The liquid refrigerant in the second chamber 200 passes through the third flow passage 500 and enters the first port of the second heat exchanger 50 through the third communication port 3, the refrigerant is evaporated in the second heat exchanger 50 so as to absorb heat, and the refrigerant enters the first inlet 42 of the compressor or enters the first inlet 42 of the compressor via the gas-liquid separator 80 after absorbing heat. In this embodiment, the fluid management assembly 10 performs the functions of throttling and gas-liquid separation. The gaseous refrigerant in the second chamber enters the second inlet 43 of the compressor, which has the effect of supplementing gas and increasing enthalpy, and is beneficial to improving the heating performance of the thermal management assembly. It should be emphasized here that the first heating mode includes at least following two cases: in the first case, the third flow passage 500 only includes the communication portion 520, that is, the third flow passage only has a communication function, the refrigerant in the second chamber 200 enters the communication portion with the pressure of the refrigerant being constant or with a small pressure difference, or in other words, the pressure of the refrigerant in the second chamber is the same as the pressure of the communication portion or the pressure difference is small. In the second case, the third flow passage 500 includes the communication portion 520 and the throttling portion 510, the refrigerant in the second chamber 200 enters the communication portion after being secondary throttled and depressurized by the throttling portion 510, the refrigerant after being secondary throttled and depressurized enters the second heat exchanger 50, which improves the heat absorption performance of the refrigerant in the second heat exchanger 50, and thus is beneficial for improving the heating performance of the first heat exchanger 20.

Figure 37:
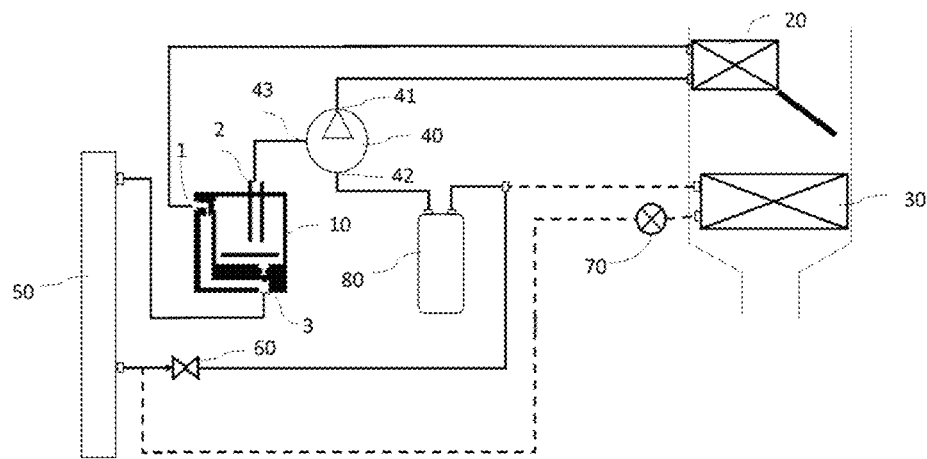
FIG. 37 is a schematic view showing the operation in a third heating mode of the thermal management system in FIG. 31.
Figure 38:
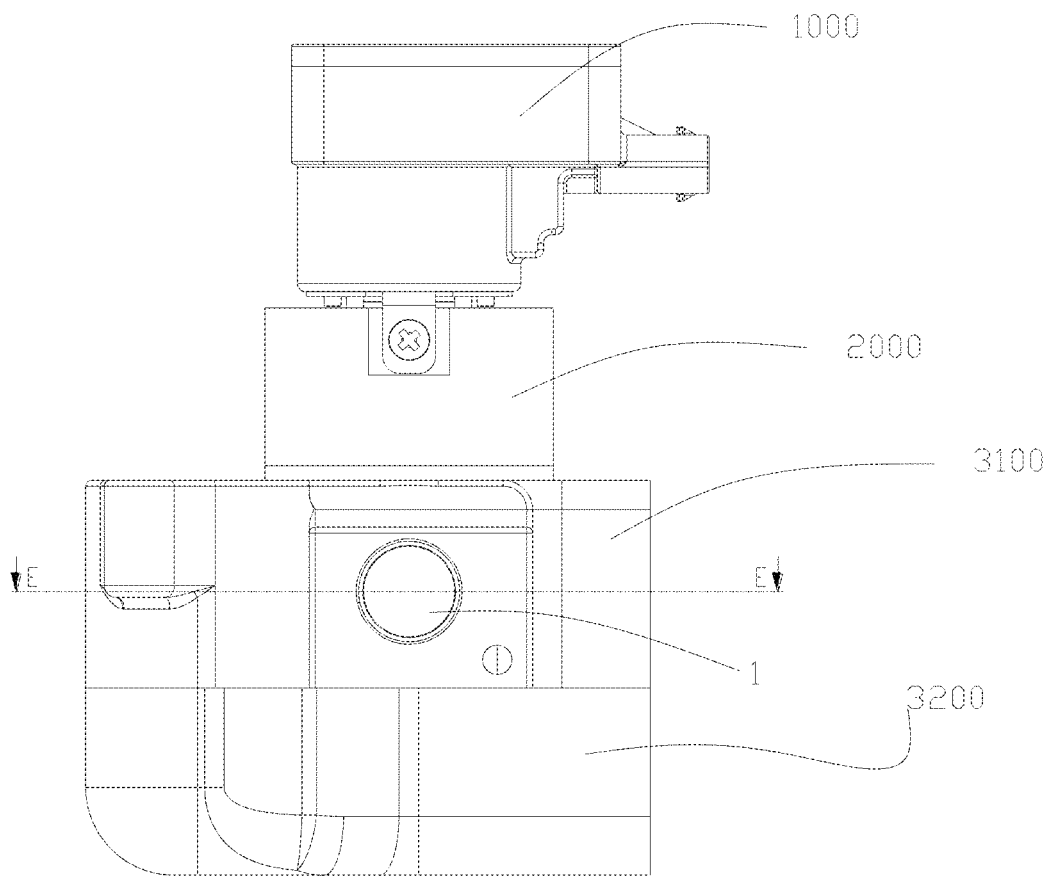
FIG. 38 is a schematic front view in FIG. 1.

Referring to FIG. 37 and FIG. 39, in the second heating mode of the thermal management system, the first valve core 5000 is in the third operation position, that is, the throttle passage 5100 causes the first chamber 100 being in communication with the fourth flow passage 600. The refrigerant with high-temperature and high-pressure releases heat in the first heat exchanger 20, the refrigerant which releases heat in the first heat exchanger 20 enters the first flow passage 300 through the first communication port 1, and enters the first chamber 100 through the first flow passage 300. Due to the throttling in the throttle passage 5100, the relatively liquid refrigerant enters the first port of the second heat exchanger 50 through the fourth flow passage 600 and the third communication port 3, the refrigerant is evaporated so as to absorb heat in the second heat exchanger 50, and the refrigerant enters the first inlet 42 of the compressor or enters the first inlet 42 of the compressor via the gas-liquid separator 80 after absorbing heat.

Figure 36:
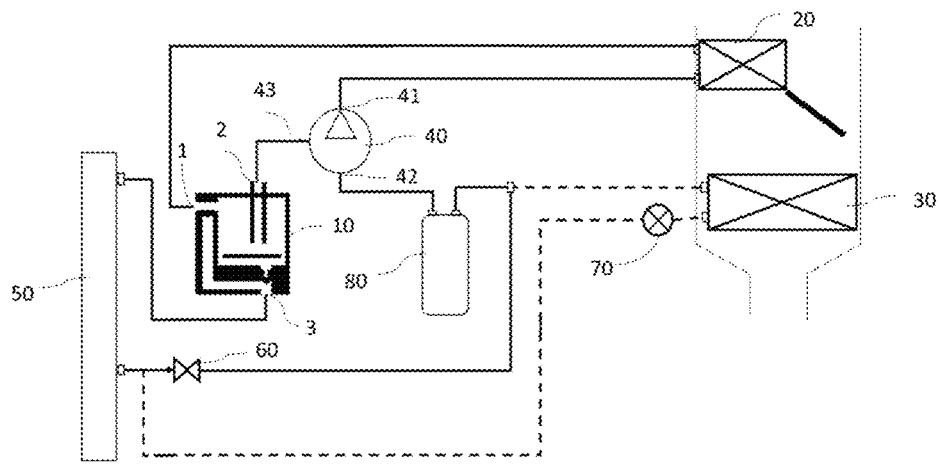
FIG. 36 is a schematic view showing the operation in a second heating mode of the thermal management system in FIG. 31.
Figure 42:
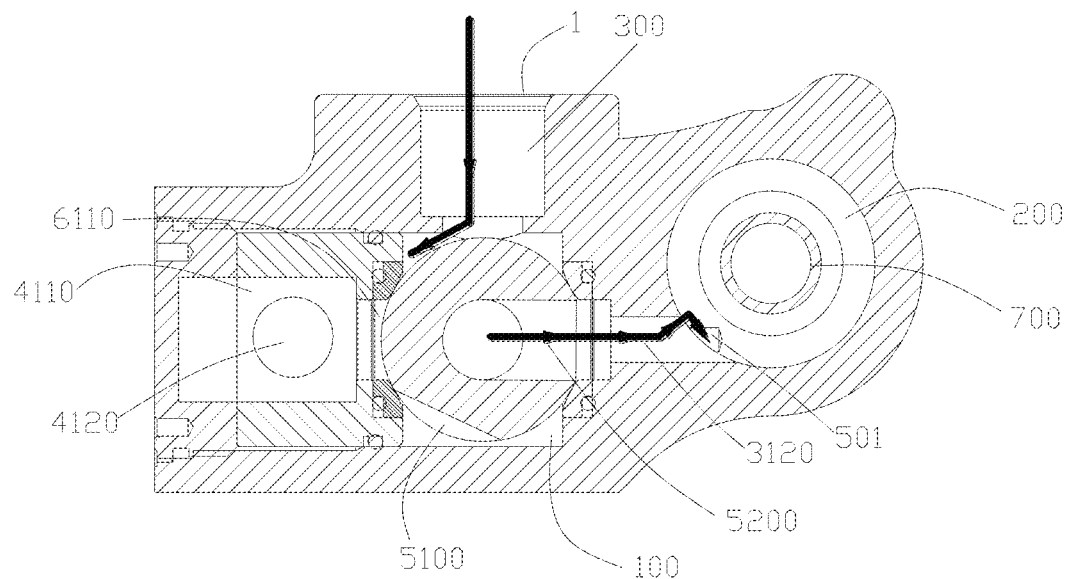
FIG. 42 is a schematic cross sectional view taken along line E-E in FIG. 38, and the first valve core is located in a fourth operation position.

Referring to FIG. 36 and FIG. 42, in the third heating mode of the thermal management system, the first valve core 5000 is in the fourth operation position, that is, the conduction passage 5200 causes the first chamber 100 being in communication with the second chamber 200. The refrigerant with high-temperature and high-pressure releases heat in the first heat exchanger 20, the refrigerant which releases heat in the first heat exchanger 20 enters the first flow passage 300 through the first communication port 1, and enters the first chamber 100 through the first flow passage 300, the refrigerant located in the first chamber 100 enters the second chamber 200 through the conduction passage 5200, the refrigerant passing through the second chamber is gas-liquid separated, and the gaseous refrigerant enters the second inlet 43 of the compressor through the second flow passage and is involved in the next circulation, the liquid refrigerant enters the first port of the second heat exchanger 50 through the third flow passage and the third communication port 3, the refrigerant is evaporated so as to absorb heat in the second heat exchanger 50, and the refrigerant enters the first inlet 42 of the compressor or enters the first inlet 42 of the compressor via the gas-liquid separator 80 after absorbing heat. It should be emphasized here that the third heating mode includes the following two cases: in the first case, the third flow passage 500 only includes the communication portion 520, that is, the third flow passage only performs the communication function, the refrigerant in the second chamber 200 enters the second heat exchanger 50 and releases heat in the second heat exchanger 50. At this time, the third heating mode is applied to a case of defrosting by the second heat exchanger 50; in the second case, the third flow passage 500 includes the communication portion 520 and the throttling portion 510, the refrigerant in the second chamber 200 enters the communication portion after being throttled and depressurized by the throttling portion 510, the refrigerant after being throttled and depressurized enters the second heat exchanger 50, and the refrigerant absorbs heat in the second heat exchanger 50. At this time, the third heating mode is applied to a case where the demanding for heating by the first heat exchanger 20 is not high.

Figure 35:
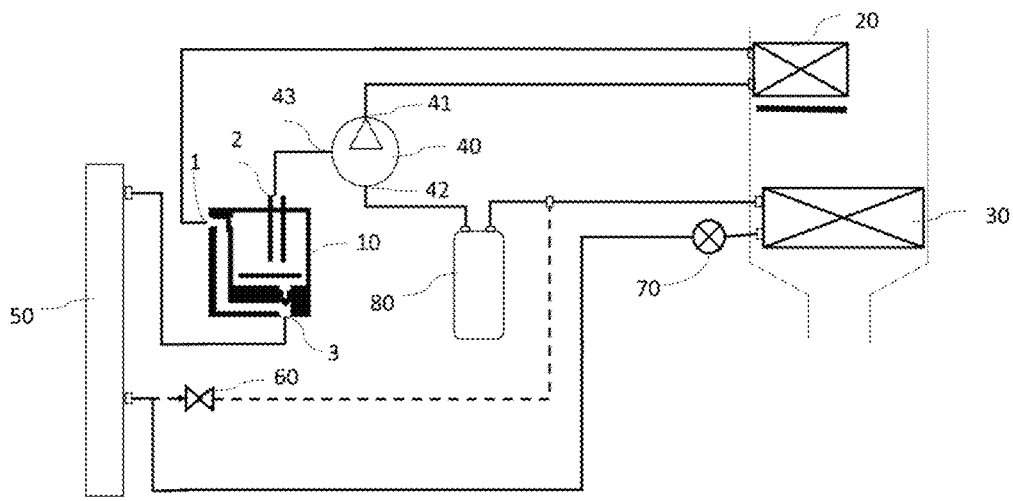
FIG. 35 is a schematic view showing the operation in a cooling mode of the thermal management system in FIG. 31.
Figure 40:
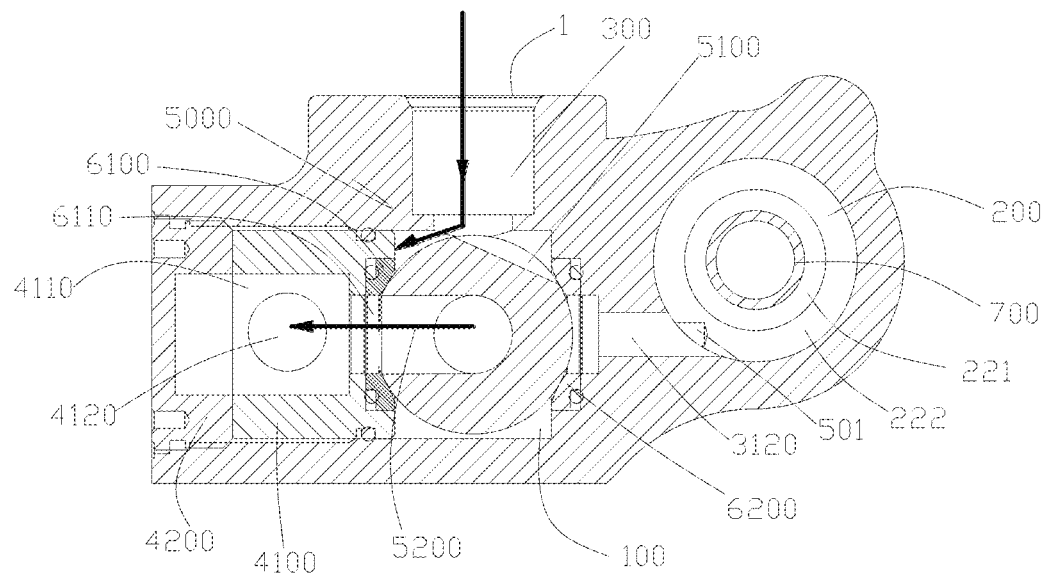
FIG. 40 is a schematic cross sectional view taken along line E-E in FIG. 38, in which first valve core is located in a first operation position.

Referring to FIG. 35 and FIG. 40, in the cooling mode of the thermal management system, the first valve core 5000 is in the first operation position, that is, the communication passage 5200 causes the first chamber 100 being in communication with the fourth flow passage 600. The temperature flap is closed, the first heat exchanger 20 performs a small amount of heat exchange or no heat exchange, the refrigerant enters the first flow passage 300 through the first communication port 1, and enters the first chamber 100 through the first flow passage 300, the refrigerant in the first chamber 100 enters the fourth flow passage through the conduction passage 5200, and then enters the second heat exchanger 50 through the third communication port 3. The refrigerant with high-temperature and high-pressure releases heat in the second heat exchanger 50, the throttling unit 70 is switched on, the refrigerant enters the third heat exchanger 30 after being throttled by the throttling unit 70, the relatively liquid refrigerant absorbs heat in the second heat exchanger 50 for reducing the temperature in the air-conditioning case, and the refrigerant enters the first inlet 42 of the compressor or enters the first inlet 42 of the compressor via the gas-liquid separator 80 after absorbing heat, and is involved in the next circulation.

Figure 32:
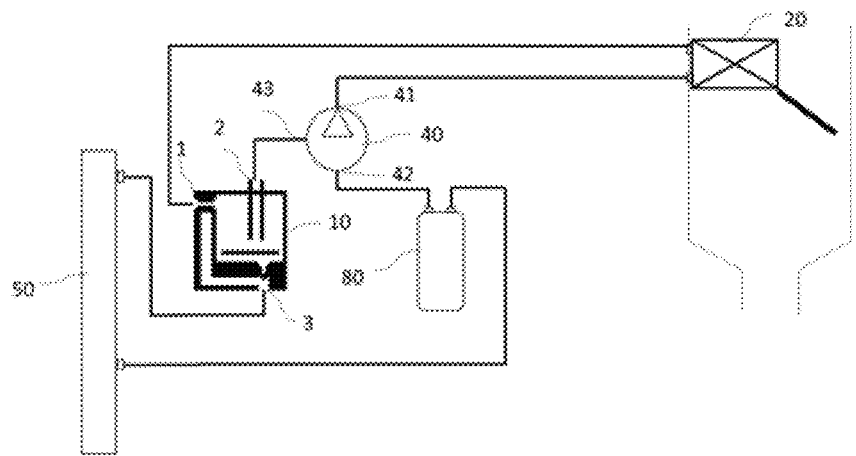
FIG. 32 is a schematic view showing the connection in a second embodiment of the thermal management system.

In other embodiments of the thermal management system, referring to FIG. 32, compared with the first embodiment of the thermal management system, the thermal management system does not include the third heat exchanger 30, the second port of the second heat exchanger 50 is only in communication with the first inlet 42 of the compressor or with the first inlet 42 of the compressor via the gas-liquid separator. It can be known that, in this embodiment, the thermal management system only has the heating mode, and does not have the cooling mode. It should be noted that thermal management systems with the above two forms of are only taken as an example and it should not limit the concept of the present application. The heating modes in some thermal management systems are the same with or equivalent to the above heating mode, which should belong to the protection scope of the present application.

It should be noted that the above embodiments are only used to illustrate the present application, and not to limit the technical solution described according to the present application, such as the definition of directionality such as "front", "rear", "left", "right", "up" and "down". This specification has described the present application in detail with reference to the above embodiments, however, those skilled in the art should understand that they can still combine, modify or equivalently replace the present application, and all technical solutions and improvements that do not depart from the spirit and scope of the present application should be covered within the scope claimed by the claims of the present application.

The invention claimed is:

1. A fluid management assembly, comprising a first valve core and a valve body, wherein the first valve core has a conduction passage, the fluid management assembly comprises a throttle chamber, the fluid management assembly comprises a first passage, a first chamber and a second chamber, the first chamber is configured to be in communication with the second chamber through the first passage, the first passage is provided with a first opening of the first passage in a wall of the second chamber, the first valve core is located in the first chamber and is able to act in the first chamber; the second chamber is formed in the valve body; the fluid management assembly comprises a first flow passage, a second flow passage, a third flow passage and a fourth flow passage, the first flow passage is in communication with the first chamber, the second flow passage is formed in the valve body, and the second flow passage is in communication with the second chamber; the third flow passage is provided with a first opening of the third flow passage on the wall of the second chamber; and the first valve core comprises a first operation position and a second operation position, in the first operation position of the first valve core, the conduction passage is configured to communicate the first chamber with the fourth flow passage; in the second operation position of the first valve core, the throttle chamber is configured to communicate the first chamber with the second chamber.

2. The fluid management assembly according to claim 1, wherein the first valve core further comprises a third operation position and/or a fourth operation position, in the third operation position of the first valve core, the throttle chamber is configured to communicate the first chamber with the fourth flow passage; in the fourth operation position of the first valve core, the conduction passage is configured to communicate the first chamber with the second chamber.

3. The fluid management assembly according to claim 1, wherein the fluid management assembly comprises a valve bonnet, the valve body comprises a first opening portion, at least part of the valve bonnet is located in a chamber formed by the first opening portion, the valve bonnet is fixedly connected to the first opening portion, a connection between the valve bonnet and the first opening portion is sealed; the fourth flow passage comprises a first conduction passage, the first conduction passage is formed in the valve bonnet, and the first conduction passage is provided with a first opening of the first conduction passage in an inner end wall of the valve bonnet.

4. The fluid management assembly according to claim 3, wherein the first conduction passage is provided with a second opening of the first conduction passage in a side wall of the valve bonnet, the valve body comprises a first valve body and a second valve body, the first valve body comprises a first through hole, a first wall and the first opening portion, the first through hole is provided with a first opening of the first through hole in the first opening portion, the first opening of the first through hole is arranged opposite to the second opening of the first conduction passage, and the first through hole is provided with a second opening of the first through hole in the first wall; the second valve body comprises a second opening portion, a second wall and a second through hole, the first wall is arranged in contact with or with a gap to the second wall, the second through hole is provided with a first opening of the second through hole in the second wall, the second through hole is provided with a second opening of the second through hole in a wall of the second opening portion, the first opening of the second through hole is arranged opposite to the second opening of the first through hole, the first through hole is in communication with the second through hole, and the fourth flow passage comprises the first conduction passage, the first through hole and the second through hole;

or the first conduction passage is provided with the second opening of the first conduction passage in an outer end wall of the valve bonnet, and the fourth flow passage comprises the first conduction passage.

5. The fluid management assembly according to claim 3, wherein the fluid management assembly comprises a conduction pipe, at least part of the conduction pipe is located in the second chamber, the second flow passage comprises a chamber of the conduction pipe, and a first port of the conduction pipe is in communication with the second chamber; and the valve body comprises the first passage, a side wall of the second chamber comprises a first sub-portion and a second sub-portion, the second sub-portion is located between a top wall of the second chamber and the first port of the conduction pipe in an axial direction of the conduction pipe, the first passage is provided with the first opening of the first passage in the second sub-portion and/or the top wall of the second chamber, and the first passage is provided with a second opening of the first passage in a bottom wall of the first opening portion.

6. The fluid management assembly according to claim 5, wherein a first cross section is defined, the first cross section is perpendicular to an axis of the conduction pipe, an axis of the first passage is located in the first cross section, an intersecting line between the first passage and the first cross section comprises a first side line and a second side line, an intersecting line between the side wall of the second chamber and the first cross section is a first loop line, an intersecting line between an outer wall of the conduction pipe and the first cross section is a second loop line, and an extension line of the first side line and an extension line of the second side line in a radial direction of the first loop line are located on the same side of the second loop line.

7. The fluid management assembly according to claim 6, wherein a bottom wall of the second chamber comprises a first bottom wall and a second bottom wall, a distance between the first bottom wall and the first port of the conduction pipe in the axial direction of the conduction pipe is less than a distance between the second bottom wall and the first port of the conduction pipe in the axial direction of the conduction pipe, and the first port of the conduction pipe faces the first bottom wall; and in the axial direction of the conduction pipe, the first sub-portion is located between the first bottom wall and the second bottom wall, and the third flow passage is provided with the first opening of the third flow passage in the first bottom wall and/or the first sub-portion.

8. The fluid management assembly according to claim 1, wherein the valve body comprises a second opening portion, the third flow passage comprises a chamber formed by the second opening portion, the chamber formed by the second opening portion comprises a throttling portion and a communication portion, the third flow passage is provided with the first opening of the third flow passage in the wall of the second chamber, the throttling portion is in communication with the first opening of the third flow passage, and the communication portion is provided with a second opening of the third flow passage in an outer wall of the valve body.

9. The fluid management assembly according to claim 8, wherein the third flow passage comprises the throttling portion and the communication portion, the throttling portion is provided with a first opening of the second opening portion in the wall of the second chamber; or the third flow passage further comprises a conduction portion, the throttling portion is located between the communication portion and the conduction portion, the communication portion is provided with a second opening of the second opening portion in the outer wall of the valve body, and the conduction portion is provided with a first opening of the second opening portion in the wall of the second chamber;

the second opening portion further comprises a mounting portion, the mounting portion is located between the throttling portion and the communication portion; the fluid management assembly further comprises a check valve component, the check valve component comprises a valve supporting seat, a second valve core and an elastic member, the valve supporting seat is relatively fixed to the mounting portion, the valve supporting seat is formed with a valve core rod hole, a communication hole, a valve port portion and a stop portion, the valve port portion is closer to the communication portion relative to the stop portion;

a valve core rod of the second valve core is located in the valve core rod hole and is slidable relative to the valve core rod hole; and the second valve core comprises a first operation position and a second operation position, in the first operation position of the second valve core, a first abutment area of the second valve core abuts against the valve port portion, and the communication hole is not in communication with the communication portion; in the second operation position of the second valve core, the first abutment area of the second valve core is separated from the valve port portion, and the communication hole is in communication with the communication portion.

10. A thermal management system, comprising a compressor, a first heat exchanger, a second heat exchanger and a fluid management assembly, wherein the compressor comprises an outlet and an inlet, the fluid management assembly comprises a first valve core and a valve body, the first valve core comprises a conduction passage, and the fluid management assembly comprises a throttle chamber;

the fluid management assembly comprises a first chamber and a second chamber, the first valve core is located in the first chamber and is able to act in the first chamber, the second chamber is formed in the valve body, the fluid management assembly is provided with a first flow passage, a second flow passage, a third flow passage and a fourth flow passage, the first flow passage is in communication with the first chamber, the second flow passage is in communication with the second chamber, a first opening of the third flow passage is formed in a wall of the second chamber, the first chamber is configured to be in communication with the fourth flow passage through the conduction passage or the throttle chamber, and the first chamber is configured to be in communication with the second chamber through the conduction passage or the throttle chamber;

the outlet of the compressor is in communication with a refrigerant inlet of the first heat exchanger, a refrigerant outlet of the first heat exchanger is in communication with a first communication port of the fluid management assembly, the first communication port is a port formed by the first flow passage in the valve body, a second communication port of the fluid management assembly is in communication with the inlet of the compressor, the second communication port is a port formed by the second flow passage in the valve body, one of the third flow passage and the fourth flow passage is configured to be in communication with the inlet of the compressor through the second heat exchanger.

11. The thermal management system according to claim 10, wherein the inlet of the compressor comprises a first inlet and a second inlet, the second communication port of the fluid management assembly is in communication with the second inlet of the compressor, one of the third flow passage and the fourth flow passage is configured to be in communication with the first inlet of the compressor through the second heat exchanger;

the fluid management assembly comprises a valve seat, the valve seat is provided with a matching surface matched with the first valve core, the first valve core comprises a throttling groove, the throttling groove is provided with an opening on an outer wall of the first valve core, a wall forming a passage of the throttle chamber comprises the throttling groove and the matching surface of the valve seat; or the first valve core comprises an throttling orifice, the throttling orifice has two openings in the outer wall of the first valve core, and a wall of the throttle chamber comprises the throttling orifice of the first valve core.

12. The thermal management system according to claim 11, wherein an operation mode of the thermal management system comprises a first heating mode in which the throttle chamber communicates the first chamber with the second chamber; the outlet of the compressor is in communication with the refrigerant inlet of the first heat exchanger, the refrigerant outlet of the first heat exchanger is in communication with the first flow passage, the second flow passage is in communication with the second inlet of the compressor, the third flow passage communicates the second chamber with a first port of the second heat exchanger, and a second port of the second heat exchanger is in communication with the first inlet of the compressor.

13. The thermal management system according to claim 12, wherein the thermal management system further comprises a third heat exchanger and a throttling unit, and the second port of the second heat exchanger is configured to be in communication with a refrigerant inlet of the third heat exchanger through the throttling unit;

the thermal management system further comprises a cooling mode, and in the cooling mode, the conduction passage of the first valve core communicates the first chamber and the fourth flow passage, the first valve core blocks a conduction passage between the first chamber and the second chamber, the outlet of the compressor is in communication with the first flow passage through the first heat exchanger, the fourth flow passage is in communication with the first port of the second heat exchanger, the throttling unit is switched on, the second port of the second heat exchanger is in communication with the refrigerant inlet of the third heat exchanger, and a refrigerant outlet of the third heat exchanger is in communication with the first inlet of the compressor.

14. The thermal management system according to claim 13, wherein the thermal management system further comprises a second heating mode, and in the second heating mode, the throttle chamber communicates the first chamber with the fourth flow passage; the outlet of the compressor is in communication with the refrigerant inlet of the first heat exchanger, the refrigerant outlet of the first heat exchanger is in communication with the first flow passage, the fourth flow passage is in communication with the first port of the second heat exchanger, and the second port of the second heat exchanger is in communication with the first inlet of the compressor;

and/or the thermal management system further comprises a third heating mode, and in the third heating mode, the conduction passage of the first valve core communicates the first chamber with the second chamber; the outlet of the compressor is in communication with the refrigerant inlet of the first heat exchanger, the refrigerant outlet of the first heat exchanger is in communication with the first flow passage, the second flow passage is in communication with the second inlet of the compressor, the third flow passage is in communication with the first port of the second heat exchanger, and the second port of the second heat exchanger is in communication with the first inlet of the compressor.

15. The thermal management system according to claim 13, wherein the thermal management system further comprises a refrigerant system, a first coolant system and a second coolant system;

the first heat exchanger comprises a refrigerant flow passage and a coolant flow passage, the refrigerant flow passage of the first heat exchanger is a part of the refrigerant system, the first coolant system comprises the coolant flow passage of the first heat exchanger, a first pump and a fourth heat exchanger, the coolant flow passage of the first heat exchanger, the first pump and the fourth exchanger are communicated in series, the thermal management system is configured to be used in a vehicle, and the fourth heat exchanger is arranged in an air duct of the vehicle;

and/or the third heat exchanger comprises a refrigerant flow passage and a coolant flow passage, the refrigerant flow passage of the third heat exchanger is a part of the refrigerant system, the second coolant system comprises the coolant flow passage of the third heat exchanger, a second pump and a fifth heat exchanger, the coolant flow passage of the third heat exchanger, the second pump and the fifth heat exchanger are communicated in series, the thermal management system is configured to be used in a vehicle, and the fifth heat exchanger is arranged in the air duct of the vehicle.

* * * * *